;
US007801629B2

(12) United States Patent
Hale et al.

(10) Patent No.: US 7,801,629 B2
(45) Date of Patent: Sep. 21, 2010

(54) MANAGEMENT OF THE FLOW OF PASSENGERS, BAGGAGE AND CARGO IN RELATION TO TRAVEL FACILITIES

(75) Inventors: Gregory B. Hale, Orlando, FL (US); Phu Van Nguyen, Orlando, FL (US); Kenneth W. Schweizer, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 1821 days.

(21) Appl. No.: 10/899,711

(22) Filed: Jul. 26, 2004

(65) Prior Publication Data
US 2005/0065834 A1 Mar. 24, 2005

Related U.S. Application Data

(63) Continuation-in-part of application No. 10/875,096, filed on Jun. 22, 2004, which is a continuation-in-part of application No. 10/687,191, filed on Oct. 15, 2003, now Pat. No. 7,532,941, which is a continuation-in-part of application No. 10/687,243, filed on Oct. 15, 2003, now Pat. No. 7,047,205, which is a continuation-in-part of application No. 10/687,226, filed on Oct. 15, 2003, now Pat. No. 7,720,718, which is a continuation-in-part of application No. 10/687,190, filed on Oct. 15, 2003, now Pat. No. 7,222,080, which is a continuation-in-part of application No. 09/617,721, filed on Jul. 17, 2000, now Pat. No. 6,889,098, which is a continuation-in-part of application No. 09/372,405, filed on Aug. 10, 1999, now Pat. No. 6,173,209.

(51) Int. Cl.
*G05B 5/22* (2006.01)
*G05B 15/00* (2006.01)
*G05B 11/01* (2006.01)
*G01C 21/34* (2006.01)
*G01C 21/36* (2006.01)
*G06Q 10/00* (2006.01)

(52) U.S. Cl. ............... 700/83; 340/825.28; 340/852.29; 705/5; 705/6; 700/17

(58) Field of Classification Search ............ 340/825.28, 340/825.29; 705/5, 6; 700/17, 83
See application file for complete search history.

(56) References Cited

U.S. PATENT DOCUMENTS 3,893,097 A 7/1975 Lach et al.
(Continued)

FOREIGN PATENT DOCUMENTS

DE 1006392 A3 8/1994
(Continued)

OTHER PUBLICATIONS

Office Actions and Notice of Allowance from related U.S. Appl. No. 11/468,284.
(Continued)

*Primary Examiner*—Ronald D Hartman, Jr.
(74) *Attorney, Agent, or Firm*—Greenberg Traurig, LLP

(57) ABSTRACT

Processing passengers for departure from an airport comprises a first line for passengers to be processed through a control point on the basis of first-in first-out. There is a second line for passengers to be processed on a non first-in first-out basis. The availability for the second line is determined by at least one of the following characteristics, namely the status of the passenger relative to an airline class of service; delays in flight times of one or more flights using the airport; cancellations of other flights using the airport; security factors at the airport; staffing at the airport; calendar date of flight, time of day of flight; number of passengers for the flight; numbers of passengers for other flights; and baggage handling. The system also processes passengers for arrival at an airport. The system also processes passengers for arrival at an airport so as facilitate baggage handling.

31 Claims, 21 Drawing Sheets

U.S. PATENT DOCUMENTS

| | | |
|---|---|---|
| 3,998,570 A | 12/1976 | Jacobs |
| 4,081,669 A | 3/1978 | Klingman |
| 4,086,475 A | 4/1978 | Churchill |
| 4,095,739 A | 6/1978 | Fox et al. |
| 4,097,727 A | 6/1978 | Ulch |
| 4,247,759 A | 1/1981 | Yuris et al. |
| 4,298,793 A | 11/1981 | Melis et al. |
| 4,398,257 A | 8/1983 | Paganini et al. |
| 4,512,667 A | 4/1985 | Doulton et al. |
| 4,538,056 A | 8/1985 | Young et al. |
| 4,598,275 A | 7/1986 | Ross et al. |
| 4,752,776 A | 6/1988 | Katzenstein |
| 4,780,599 A | 10/1988 | Baus |
| 4,802,218 A | 1/1989 | Wright et al. |
| 4,816,658 A | 3/1989 | Khandwala et al. |
| 4,818,998 A | 4/1989 | Apsell et al. |
| 4,889,981 A | 12/1989 | Harbers |
| 5,006,983 A | 4/1991 | Wayne et al. |
| 5,038,290 A | 8/1991 | Minami |
| 5,066,853 A | 11/1991 | Brisson |
| 5,134,720 A | 7/1992 | Gamgee et al. |
| 5,210,786 A | 5/1993 | Itoh |
| 5,245,163 A | 9/1993 | Yehuda |
| 5,287,269 A | 2/1994 | Dorrough et al. |
| 5,305,197 A | 4/1994 | Axler et al. |
| 5,317,318 A | 5/1994 | Thomas et al. |
| 5,367,330 A | 11/1994 | Haave |
| 5,408,417 A | 4/1995 | Wilder |
| 5,429,361 A | 7/1995 | Raven et al. |
| 5,455,851 A | 10/1995 | Chaco et al. |
| 5,461,371 A | 10/1995 | Matsumoto et al. |
| 5,465,115 A | 11/1995 | Conrad et al. |
| 5,491,326 A | 2/1996 | Marceau et al. |
| 5,502,806 A | 3/1996 | Mahoney et al. |
| 5,541,835 A | 7/1996 | Dextraze et al. |
| 5,655,053 A | 8/1997 | Renie |
| 5,724,520 A | 3/1998 | Goheen |
| 5,754,654 A | 5/1998 | Hiroya et al. |
| 5,893,097 A | 4/1999 | Hayata et al. |
| 5,905,521 A | 5/1999 | Gatto |
| 5,929,848 A | 7/1999 | Albukerk et al. |
| 5,940,510 A | 8/1999 | Curry et al. |
| 5,946,444 A | 8/1999 | Evans et al. |
| 5,948,040 A | 9/1999 | DeLorme et al. |
| 5,966,654 A | 10/1999 | Croughwell et al. |
| 5,978,770 A | 11/1999 | Waytena et al. |
| 5,987,420 A | 11/1999 | Maeda et al. |
| 5,987,421 A | 11/1999 | Chuang |
| 6,094,640 A | 7/2000 | Goheen |
| 6,154,818 A | 11/2000 | Christie |
| 6,167,443 A | 12/2000 | Decker et al. |
| 6,173,209 B1 | 1/2001 | Laval et al. |
| 6,208,976 B1 | 3/2001 | Kinebuchi et al. |
| 6,216,227 B1 | 4/2001 | Goldstein et al. |
| 6,260,027 B1 | 7/2001 | Takahashi et al. |
| 6,263,088 B1 | 7/2001 | Crabtree et al. |
| 6,329,919 B1 * | 12/2001 | Boies et al. ............... 340/573.1 |
| 6,363,351 B1 | 3/2002 | Moro |
| 6,374,176 B1 | 4/2002 | Schmier et al. |
| 6,424,623 B1 | 7/2002 | Borgstahl et al. |
| 6,454,174 B1 | 9/2002 | Sansone |
| 6,463,534 B1 | 10/2002 | Geiger et al. |
| 6,490,409 B1 | 12/2002 | Walker |
| 6,529,786 B1 | 3/2003 | Sim |
| 6,775,518 B2 | 8/2004 | Norcott et al. |
| 6,813,608 B1 | 11/2004 | Baranowski |
| 7,535,367 B2 * | 5/2009 | Ratnakar ............... 340/573.1 |
| 2001/0016825 A1 | 8/2001 | Pugliese et al. |
| 2002/0007292 A1 | 1/2002 | Paxton et al. |
| 2002/0116233 A1 | 8/2002 | Kuge |
| 2002/0116235 A1 | 8/2002 | Grimm et al. |
| 2003/0023463 A1 | 1/2003 | Dombroski et al. |
| 2003/0055689 A1 | 3/2003 | Block et al. |
| 2003/0093305 A1 * | 5/2003 | Davis et al. ................ 705/5 |
| 2005/0045710 A1 | 3/2005 | Burke |
| 2005/0258230 A1 * | 11/2005 | Wiater ................ 235/375 |
| 2005/0258231 A1 * | 11/2005 | Wiater ................ 235/375 |
| 2007/0241927 A1 * | 10/2007 | Ratnakar ............ 340/825.28 |
| 2008/0097799 A1 * | 4/2008 | Scribner ................ 705/5 |

FOREIGN PATENT DOCUMENTS

| | | |
|---|---|---|
| EP | 0086199 1 | 4/1987 |
| EP | 1076319 A1 | 2/2001 |
| FR | 2612669 | 9/1988 |
| FR | 2650095 | 1/1991 |
| FR | 2805895 A | 9/2001 |
| GB | 2193359 A | 2/1988 |
| GB | 2228123 A | 8/1990 |
| GB | 9523443.1 | 11/1995 |
| GB | 2307324 A | 5/1997 |
| JP | 01-134565 | 5/1989 |
| JP | 05-073596 | 3/1993 |
| JP | 06-019940 | 1/1994 |
| JP | 06-203238 | 7/1994 |
| JP | 07-234893 | 9/1995 |
| JP | 08-315188 | 11/1996 |
| JP | 09-327991 | 12/1997 |
| JP | 10-049571 | 2/1998 |
| WO | WO 90.09002 | 8/1990 |
| WO | WO 97.18534 | 5/1997 |

OTHER PUBLICATIONS

Office Actions and Notice of Allowance from related U.S. Appl. No. 10/687,191.
Office Actions from related U.S. Appl. No. 10/687,226.
Office Actions and Notice of Allowance from related U.S. Appl. No. 10/687,243.
Office Actions and Notice of Allowance from related U.S. Appl. No. 10/687,190.
Office Actions and Notice of Allowance from related U.S. Appl. No. 09/617,721.
Office Actions and Notice of Allowance from related U.S. Appl. No. 09/372,405.
Office Actions from related U.S. Appl. No. 10/875,096.
From/IBM (Special Issue IBM Pavilion, New York World's Fair), Article(s), Apr. 21, 1965, 4 page(s).
News Release for King County; dated Feb. 28, 2001; retrieved from www.metrokc.gov/exec/news/2001/022801proc.htm.
News Release for King County; dated Mar. 2, 2001; retrieved from www.metrokc.gov/exec/news/2001/030101fema.htm.
News Release for King County; dated Feb. 28, 2001; retrieved from www.metrokc.gov/exec/news/2001/0302012.htm.

* cited by examiner

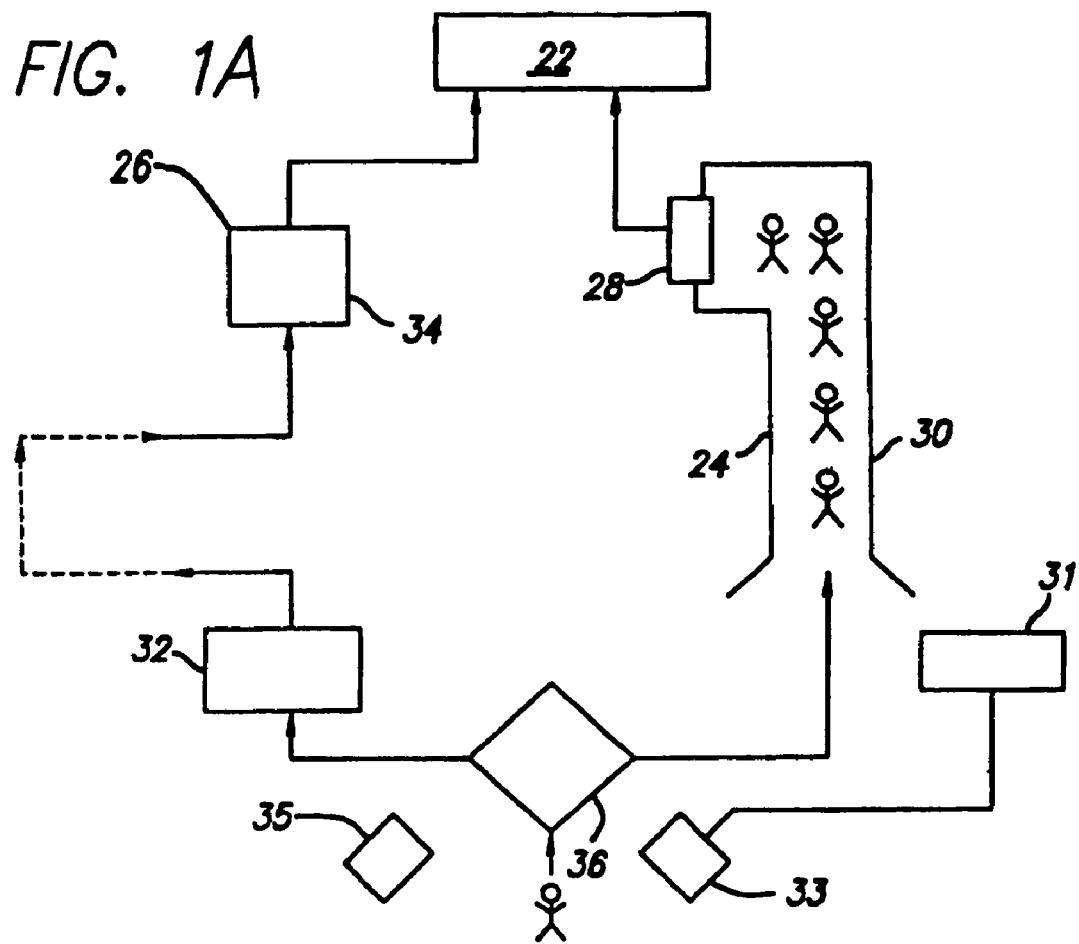

MANAGEMENT OF THE FLOW OF PASSENGERS, BAGGAGE AND CARGO IN RELATION TO TRAVEL FACILITIES

RELATED APPLICATIONS

This Application is a continuation-in-part of U.S. patent application Ser. No. 10/875,096, filed on Jun. 22, 2004, entitled MANAGEMENT OF THE FLOW OF PERSONS IN ENTERTAINMENT ENVIRONMENTS; U.S. patent application Ser. No. 10/687,191, filed on Oct. 15, 2003 now U.S. Pat. No. 7,532,941, entitled MANAGEMENT OF THE FLOW OF PERSONS IN RELATION TO CENTERS OF CROWD CONTROL VIA WIRELESS CONTROL; U.S. patent application Ser. No. 10/687,243, filed on Oct. 15, 2003 now U.S. Pat. No. 7,047,205, entitled MANAGEMENT OF THE FLOW OF PERSONS IN RELATION TO CENTERS OF CROWD CONTROL VIA PRIORITY CONTROL; U.S. patent application Ser. No. 10/687,226, filed on Oct. 15, 2003 now U.S. Pat. No. 7,720,718, entitled MANAGEMENT OF THE FLOW OF PERSONS IN RELATION TO CENTERS OF CROWD CONTROL VIA TELEVISION CONTROL; U.S. patent application Ser. No. 10/687,190, filed on Oct. 15, 2003 now U.S. Pat. No. 7,222,080, entitled MANAGEMENT OF THE FLOW OF PERSONS IN RELATION TO CENTERS OF CROWD CONCENTRATION; all of which are continuations-in-part of U.S. patent application Ser. No. 09/617,721, filed on Jul. 17, 2000 now U.S. Pat. No. 6,889,098, entitled METHOD AND APPARATUS FOR MANAGING FACILITY ADMISSIONS, which in turn is a continuation-in-part of U.S. patent application Ser. No. 09/372,405, filed on Aug. 10, 1999, and issued as U.S. Pat. No. 6,173,209 on Jan. 9, 2001. The contents of these applications are incorporated by reference herein in their entirety.

BACKGROUND

1. Field of the Disclosure.

This disclosure relates to control of passengers, baggage, cargo, crowds and congestion of people and property. In particular, it concerns the control of the flow of masses of people. More specifically, this is in relation to specific areas which are centers of concentration for crowds particularly at travel departure and arrival points. The methods and systems of the disclosure also concern managing the entry, admission to and passage through multiple facilities. In particular, the disclosure is concerned with the management of multiple facilities in airport environments. More particularly this is concerned with facilities such as security checkpoint locations.

There are different techniques used to manage lines at airports and achieve for passengers of airport environments a pleasant experience in minimizing wait times and permitting efficient use of time spent in these airports. Similarly, there is a need for operators of airport facilities to improve the throughput of passengers at different facilities and establishments in the airport. In this way, there is an efficient use of different facilities and passengers can use different facilities in a way which benefits the airport.

Overall, the airport experience for passengers and operators of airport facilities needs to be enhanced.

The disclosure is concerned with a method and system for managing the loading of passengers at different facilities in an airport environment where there are multiple facilities. More particularly, the disclosure is concerned with management of lines or queues of passengers in an effective manner which is user-friendly and at the same time provides a system directed towards maximizing use of the facilities in the airport by as many passengers as possible.

An improved system, method and apparatus for managing access and loading of facilities in an airport environment are thus desired.

SUMMARY OF THE DISCLOSURE

This disclosure in one form relates to a system and method for managing the processing of passengers and property at multiple facilities in an airport environment. As such the term 'passenger checkpoint' includes travel centers, passenger check-in locations, baggage collection areas, immigration checkpoints, security locations and loading gates at an airport. It provides for passengers and passengers the choice of standing in a first-in first-out line for the passenger checkpoint, or having a space reservation for admission to the passenger checkpoint at a later time without standing in the first-in first-out line or queue.

Wait time at the airport due to various unknown circumstances is increasingly unpredictable and unpleasant. The influx of travelers creates congestion at various airport checkpoints. For example, this can be at ticket counters and security checkpoints.

According to the invention, once a ticket is purchased from home, a resort, or at the airport, an AIRPASS (Trademark of Disney Enterprises, Inc.) system queues the traveler(s) as to when to arrive at the airport and/or at various checkpoints within the airport. A dynamic AIRPASS algorithm determines the capacity and queues the traveler at the appropriate times. Examples of different variables the dynamic AIRPASS algorithm examines are as follows: delays, cancellations, available security checkpoints, staffing, shift changes, security sensitivity level, travel due to time of year, travel due to time of day, ticketed capacity and walk-up travelers, flight departure time, flight arrival time, class of service based on ticket purchased, and baggage handling.

The AIRPASS system can be combined with other time and attendance systems to dynamically adjust the number of stations required to meet demand and employees required to man each security station depending on, but not limited to: current virtual wait time, estimated number of users waiting in an existing first-in first-out queue, number of available stations, walk time to gate, departure time, and arrival time.

The AIRPASS system can be combined with a baggage identification system, such as but not limited to a RFID baggage tagging system—to dynamically adjust an AIRPASS return time based on the airport's baggage check policy.

The AIRPASS system can be combined with a merchandising system, so as to issue discount coupons for various merchandise. The AIRPASS algorithm will use variables such as, but not limited to: flight departure time, flight arrival time, wait time to enter an AIRPASS queue, airline schedules, terminal schedules, and routing location for routing a passenger for a discount. Thus, the usage of various merchandise and/or restaurant locations can be maximized.

This AIRPASS system can be combined with the following system to enhance its overall efficiency and service: biometric for identification and validation, and electronic notifications and updated queue times.

Processing passengers for departure from a travel center such as an airport comprises a first line for passengers to be processed through a control point on the basis of first-in first-out. There is a second line for passengers to be processed on a non first-in first-out basis. An algorithm determines the likely line load related to the number of passengers in the first line on a selected time and thereby determines the number of places available to allocate to passengers in the second line. The determination of spaces available in the second line can be determined solely by the load conditions in the first line. Alternatively, the availability for the second line is not determined by the status of the passenger relative to an airline class of service; namely, it is not determined by whether the passenger is traveling "first class" or is a premier participant of a frequent flyer program.

The availability for the second line is determined by at least one of the following characteristics, namely the status of the passenger relative to an airline class of service; delays in flight times of one or more flights using the airport; cancellations of other flights using the airport; security factors at the airport; staffing at the airport; calendar date of flight, time of day of flight; number of passengers for the flight; numbers of passengers for other flights; and baggage handling.

The system also processes passengers, cargo and baggage for arrival at an airport so as to facilitate cargo and baggage handling.

The disclosure further provides for an improvement whereby a control computer and software system dynamically and constantly adjusts to account for variations in the airport environment, the passenger load, external factors such as weather, breakdown or slowing down of certain facilities in the airport complex.

The disclosure includes a method and system of managing the loading by passengers of multiple facilities and baggage and cargo in an airport environment. Different passengers are permitted access to the passenger checkpoint on at least two bases, firstly, on a first-in first-out basis, and secondly, on an AIRPASS basis established by a prior allocation of a space to the passenger checkpoint.

The method and system further permits a passenger of a facility to use a wireless device in order to facilitate access to a passenger checkpoint. The wireless device may, for example, be a mobile telephone. Entry of a request on the wireless device is made for an allocation of access at the passenger checkpoint. This includes the steps of:
  i. registering/authenticating a passenger with a reservation system;
  ii. receiving an input from a passenger at a remote location, the input being communicated to a central computer for requesting a reservation or access for the passenger checkpoint;
  iii. permitting the receiving of a response by the passenger remotely about available times for access to the passenger checkpoint; and
  iv. permitting the passenger to effect a selection of one of the available times.

A keying operation is employed through the mobile telephone to request access to a first passenger checkpoint. The passenger may be at a remote location from the first passenger checkpoint. The input from the remote location is generated from a telephone keypad, or other input device employed by the wireless device. The passenger is provided with a menu from which to make selections. The menu may, for example, be displayed on an LCD display as is common on mobile telephones. The input is effected for selecting from multiple facilities in the travel environment. In an alternative form, the mobile telephone or wireless device is responsive to voice actuation by a user or passenger for requesting access to the first passenger checkpoint and/or making different selections from the menu.

In another aspect of the present disclosure, there is a hierarchy for passengers using the AIRPASS system. Different passengers in the hierarchy are permitted access to a first passenger checkpoint. A request for an allocation of a space at the first passenger checkpoint includes the steps of:
  i. receiving an input from a remote location. The input is communicated to a central computer for requesting a reservation for a passenger checkpoint;
  ii. allocating available times in relation to a level of a passenger in the hierarchy;
  iii. permitting receiving of a response remotely about available times for the first passenger checkpoint; and
  iv. permitting the passengers to affect a choice of a selected available time.

In one format, the hierarchy is preferably determined on the basis of those remotely located from the environment when making an AIRPASS request relative to those located at the environment making the AIRPASS request. Alternatively, the hierarchy can be based on those located in a passenger checkpoint associated with the environment when making the request, and those located at the environment making the AIRPASS request.

For example, in one embodiment a passenger who is located at an airport venue is sent notification that they can reserve access to facilities ahead of their visit. The passenger uses a computer that is connected to the Internet to visit a website in order to make a request for an AIRPASS reservation to the facilities in accordance with the present disclosure. The AIRPASS reservation provides for entry of the passenger within a specified time window to the facilities. In yet another embodiment, the airport venue may offer a service to hotels or other surrounding venues whereby a passenger may make AIRPASS requests prior to their visit to the airport venue. For example, a passenger would use the television and remote control in their hotel room to make the AIRPASS reservation for entry within a specified time window to one or more facilities the day before their visit to the venue. In the preferred implementation, there already needs to be a valid pass or ticket for the airport venue prior to being able to purchase or obtain the AIRPASS reservation for the passenger checkpoint. Preferably there can be a validation of the pass or ticket by the computer system before issuing the AIRPASS reservation.

In yet another aspect of the disclosure there is provided multiple AIRPASS request systems to selected passengers, the multiple requests being for different facilities in the environment. This way, a passenger can schedule visits to multiple facilities.

Multiple AIRPASS requests can be permitted to selected passengers, the multiple requests being for different facilities in the environment. The multiple AIRPASS requests can be for different passengers in a selected group and can be at least one of the levels of the hierarchy of passengers.

The multiple AIRPASS requests can be combined with the Airport's security notification system so that it will alert appropriate security personnel if a user has requested more then a predetermined number of AIRPASS requests.

In yet a further aspect of the disclosure, application through an entry of an allocation of a space at a first passenger checkpoint includes the steps of:
  i. receiving an input from a remote location. The input is effected through a control device associated with an interactive television unit, selectively a digital television. A control device operates the television, and the input is communicated to a central computer for regulating the load of the first passenger checkpoint;
  ii. permitting receiving of a response remotely about the available return times for the first passenger checkpoint; and iii. permitting the passenger to affect a choice of a selected available return time.

The television can be locatable remotely from the environment. The remote location can be selectively in at least one of a room of a passenger, the room being associated with the airport environment. Alternatively, the television can be in a common area of a facility housing the room.

The television application of the disclosure can include different aspects of a hierarchy of available times determined on the basis of those remotely located from the environment when making an AIRPASS request and those located at the environment making the AIRPASS request.

The AIRPASS access can be redeemable through a selected essentially automatic procedure. Such procedure can include any one or more of the reading of one of an RF identification, reading of a magnetic code or barcode allocated to the passenger. Redemption can be at a time of entry into the environment or at the passenger checkpoint in the environment.

A computing process determines the mix ratio of numbers of accesses granted to the AIRPASS access and non-AIRPASS access. Redemptions of the AIRPASS accesses are fed back such that near real time updates of availability for further granting of accesses may be computed.

There is also the ability to permit at least one of the exchange or return of previously assigned AIRPASS access. Such exchange permits for updating the computation of a load of the passenger checkpoint. A non-use of an AIRPASS assignment is preferably factored into a computation of loading.

A goal of this disclosure is to improve the desired functionality needed to derive increased passenger satisfaction.

The disclosure is further described in relation to the AIRPASS system of achieving line management. For ease of reference the trademark AIRPASS is used herein. It is, however, not the only system of line or queue management covered by this disclosure. The disclosure generally covers different AIRPASS systems operable conjunctively with the first-in first-out system.

The disclosure also concerns different aspects of crowd, passenger, baggage and cargo control in many different environments and circumstances as more generally described below.

Further objects, features and advantages of the present disclosure will become apparent from the detailed description and drawings, which follow, when considered with the attached figures.

BRIEF DESCRIPTION OF THE DRAWINGS

FIG. 1A is a schematic overview of a passenger checkpoint admission management system in accordance with an embodiment of the disclosure for managing admission to a single passenger checkpoint.

DETAILED DESCRIPTION OF THE DISCLOSURE

Figure 1B:
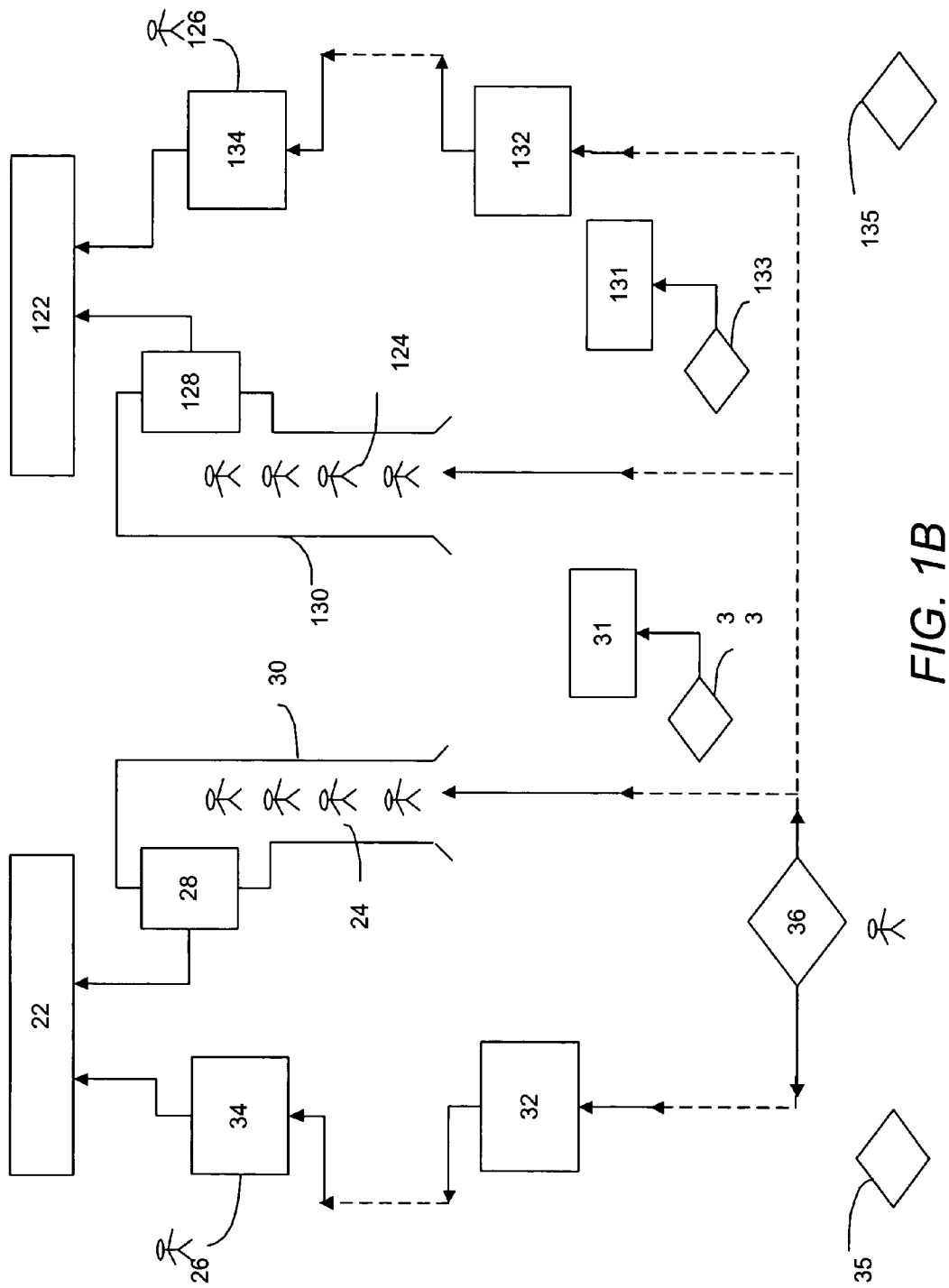
FIG. 1B is a schematic overview of a passenger checkpoint admission management system in accordance with an embodiment of the disclosure for managing admission to a multiple passenger checkpoints relating to the same flight.

In the following description, numerous specific details are set forth in order to provide a more thorough description of the present disclosure. It will be apparent, however, to one skilled in the art, that the present disclosure may be practiced without these specific details. In some instances, well-known features may have not been described in detail so as not to obscure the disclosure.

There is at least a method and a system for managing admission to a passenger checkpoint. The system is particularly applicable for use in an environment where the number of passengers which desire access to a passenger checkpoint is greater, at one or more times, than the capacity of the passenger checkpoint. Such a condition may be referred to as a condition of insufficient capacity. By insufficient capacity, it is meant that fewer passengers can be accommodated at/by the passenger checkpoint than wish to be accommodated at a particular time or over a period of time. This condition may arise by an imposed limitation, such as where it is desired to limit the number of passengers in a particular area at a given time. This may be for safety, security or a variety of other purposes. This condition may also arise due to physical limitations, such as the number of spaces at a particular passenger checkpoint and the cycle time of the passenger checkpoint.

A system for processing passengers for departure from an airport comprises a first line for passengers to be processed through a control point on the basis of first-in first-out, and a second line for passengers to be processed on a non first-in first-out basis.

There is an algorithm for determining the likely line load related to the number of passengers in the first line at a selected time and to thereby determine the number of places available to allocate to passengers in the second line.

The determination of spaces available in the second line is determined solely by the load conditions in the first line. Alternatively the availability for the second line is not determined by the status of the passenger relative to an airline class of service.

The availability for the second line is determined by at least one of the following characteristics, namely the status of the passenger relative to an airline class of service; delays in flight times of one or more flights using the airport; cancellations of other flights using the airport; security factors at the airport; staffing at the airport; calendar date of flight, time of day of flight; number of passengers for the flight; numbers of passengers for other flights; and baggage handling.

A system also operates for processing passengers, baggage and cargo for arrival at an airport to provide a method and system for handling check-in of passengers at terminals and passing of passengers through security points at airports.

Further, the system processes passengers for arrival at an airport so as to facilitate passenger and baggage handling. There is a first line for baggage of passengers to be processed through a control point on the basis of first-in first-out. A second line is for baggage of passengers not to be processed on a first-in first-out basis. An algorithm determines the likely line load related to the number of passengers in the first line at a selected time and thereby determining the number of places available to allocate to baggage of passengers in the second line.

FIG. 1A is a schematic overview of a passenger checkpoint admission management system in accordance with an embodiment of the disclosure for managing admission to a single passenger checkpoint. The system is for use in controlling admission or entry to a passenger checkpoint 22. As used herein, the term "passenger checkpoint" is meant to comprise any location or presentation to which one or more passengers, passengers or passengers wish to gain access. The passenger checkpoint may comprise a location at which a service is provided. Thus, while the system has particular applicability to and is described herein for use in controlling access to a passenger checkpoint, the system may be used in a wide variety of other environments where it is desired to avoid lines. A passenger waits to enter the passenger checkpoint admission management system at location 36.

The system includes a first queue 24 by which passengers gain access to the passenger checkpoint 22 by waiting in a line, much as has been to date in the prior art. In other words, the passengers in the first queue 24 have an order in line based on a time at which they enter the queue, and are able to utilize the passenger checkpoint 22 in that order when a space or capability is available. In one or more embodiments, the first queue 24 includes a turnstile or gate 28, or similar device for controlling access, positioned at an entrance of the passenger checkpoint 22. The first queue 24 may also include ropes, fences 30 or the like for defining a space in which the passengers line up.

The passengers in the first queue 24 are permitted to access the passenger checkpoint 22 when there is an open spot not filled by the passengers accessing the passenger checkpoint via the second queue 26. As described in more detail below, the number of passengers permitted to access the passenger checkpoint via the second queue 26 may be adjusted to provide a certain number of open (available) spots for passengers in the first queue 24. For example, 80% of the available spots for the passenger checkpoint 22 may be dedicated to and filled by passengers from the second queue 26, while the remaining 20% are filled by passengers from the first queue 24. In addition, if one or more of the spots dedicated to the passengers of the second queue 26 are not filled, such as if one or more passengers who obtain passes for accessing the second queue 26 do not return to access the passenger checkpoint 22; these spots may be filled by passengers in the first queue 24. As described in more detail below, this arrangement permits the passenger checkpoint 22 to operate at all times at optimum capacity.

The system of the disclosure also includes the second queue 26 by which passengers gain access to the passenger checkpoint 22 without waiting in a line, avoiding the first queue 24. In one or more embodiments, the system includes at least one validator for validating the right of a passenger to receive an assigned time to access the passenger checkpoint via the second queue.

In the embodiment illustrated in FIG. 1A, the system includes a first validator 32 validating the right of a passenger to receive an assigned future time to utilize the second queue 26, and a second validator 34 for permitting the passenger to access the passenger checkpoint 22 at a future time via the second queue 26. In this manner, the passenger can avoid the first queue 24.

In operation, a passenger utilizes the first validator 32 to obtain an assigned time in the future for accessing the passenger checkpoint 22 via the second queue 26. As described below, in one embodiment, an entitled or "validated" passenger may be issued a pass which includes a time or time range at which the passenger is entitled to return and utilize the passenger checkpoint 22. The amount of time between the time a pass is issued and the time at which the passenger can utilize the passenger checkpoint 22 depends at a number of factors, including: the number of people who have already obtained passes, the capacity of the passenger checkpoint 22, the operating speed of the passenger checkpoint 22, staffing availability, the capacity of the passenger checkpoint 22 allocated to the passengers accessing it via the second queue 26, and any delays related to operation of the passenger checkpoint 22 or served by the passenger checkpoint 22.

When the assigned time or time range (such as that indicated on the AIRPASS) or a specified time window to access facilities occurs, the passenger is entitled to access the passenger checkpoint 22 without waiting in line. The passenger accesses the second queue 26 and establishes entitlement to access the passenger checkpoint 22 via the second queue 26. In one embodiment, the passenger presents the issued pass at second validator 34 and if the pass is valid, i.e., the time or time range is appropriate, the pass is not counterfeit, etc., the passenger is admitted to the passenger checkpoint 22.

In some cases, a passenger may only use the second queue 26 when the passenger has not previously been issued a yet unused or unexpired pass. This scheme is to prevent passengers from obtaining multiple passes for a single passenger checkpoint, preventing others from enjoying it, or to prevent passengers from reserving admittance to multiple facilities. A passenger may be permitted to obtain multiple passes for one or more facilities, as described in greater detail below.

As further illustrated in FIG. 1A, at or near an entrance to the passenger checkpoint 22, a passenger is presented with a point of decision where the passenger decides whether to access the passenger checkpoint 22 via the first queue 24 or the second queue 26. When there is no appreciable line in the first queue 24, the passenger may decide to forego the second queue 26 and utilize the passenger checkpoint 22 in a prior art manner. If the line or queue 24 is too long, or if the passenger wishes to utilize the system of the disclosure, the passenger chooses the second queue 26.

The system includes a first queue wait time generator 31 and associated display 33. The first queue wait time generator 31 is configured to generate a time regarding a wait time associated with accessing the passenger checkpoint 22 via the first queue 24 by a passenger about to enter the first queue 24. Of course, the wait time may be calculated manually, such as by tracking the wait time of one or more particular passengers through the first queue 24 from time of entry until time of the passenger checkpoint 22. In one or more embodiments, the first queue wait time generator 31 includes sensors which provide data for use by the generator 31 in determining a current length of the wait time associated with that line. The sensors may provide information such as the physical length of the line. The generator 31 may use this information and information such as the current passenger checkpoint capacity, percentage of capacity allocated to passengers accessing via the second queue 26, and other factors for generating an approximate first queue wait time. Various data for use by the generator 31 may be input manually as well. For example, a passenger checkpoint operator may visually estimate the physical length of a line and input line length data to the generator 31. The first queue wait time display 33 is configured to provide a passenger at the point of decision with the first queue wait time information. The display 33 may comprise a digital or other display for displaying hours and/or minutes of wait time.

The system includes a second queue time display 35. This display 35 is configured to display the next time, which will be assigned to a passenger for accessing the passenger checkpoint 22 through the second queue 26. The display 35 may comprise a digital or other display displaying hours and/or minutes of wait time.

Using the information regarding the access times available to a passenger via the displays 33 and 35 respectively, a passenger is aided in the process of deciding to access the passenger checkpoint 22 through the first or second queues 24 and 26 respectively.

The first validator 32 for verifying entitlement of a passenger to an assigned future time may be located remote from the passenger checkpoint 22 or there may be more than one first validator 32, one located near the passenger checkpoint 22 and one or more located remote therefrom. For example, the first validator 32 may be located near an entrance to an airport. In such an event, a display 33 for displaying first queue waiting time and a display 35 for displaying the next available time for accessing the passenger checkpoint 22 via the second queue 26 may be located at the remote first validator 32 as well.

FIG. 1B is a schematic overview of a passenger checkpoint admission management system in accordance with an embodiment of the disclosure for managing admission to a multiple passenger checkpoints relating to the same flight. The system is for use in controlling admission or entry to passenger checkpoints 22 and 122, where the passenger checkpoint 22 may be the security station associated with a designated airline flight and the passenger checkpoint 122 may be the baggage check-in associated with the designated airline flight.

The system includes first queues 24 and 124 in which passengers gain access to the passenger checkpoint 22 via first queue 24 and the passenger checkpoint 122 via first queue 124 by waiting in a line, much as has been to date in the prior art. In other words, the passengers in the first queues 24 and 124 have an order in line based on a time at which they enter the queue, and are able to utilize the passenger checkpoint in that order when a space or capability is available. In one or more embodiments, the queues 24 and 124 include respectively turnstiles or gates 28 and 128, or similar devices for controlling access, positioned respectively at an entrance of the passenger checkpoints 22 and 122. The first queues 24 and 124 respectively may also include ropes, fences 30 and 130 or the like, for defining a space in which the passengers line up.

The passengers in the first queues 24 and 124 are permitted to access respectively the passenger checkpoints 22 and 122 when there is an open (available) spot not filled by the passengers accessing the passenger checkpoints 22 and 122 respectively via the second queues 26 and 126. As described in more detail below, the number of passengers permitted to access the passenger checkpoints 22 and 122 via the second queues 26 and 126 respectively may be adjusted to provide a certain number of open (available) spots for passengers in the first queues 24 and 124. For example, 80% of the available spots for the passenger checkpoint 22 may be dedicated to and filled by passengers from the second queue 26 while the remaining 20% are filled by passengers from the first queue 24 respectively. In the same example of the present embodiment, 60% of the available spots for the passenger checkpoint 122 may be dedicated to and filled by passengers from the second queue 126, while the remaining 40% are filled by passengers from the first queue 124.

In addition, if one or more of the spots dedicated to the passengers of the second queues 26 and 126 respectively are not filled, such as if one or more passengers who obtain passes for accessing the second queues 26 and 126 respectively do not return to access the passenger checkpoints 22 and 122 respectively, then these spots may be filled by passengers in the first queues 24 and 124. As described in more detail below, this arrangement permits the passenger checkpoints 22 and 122 to operate at all times at optimum capacity.

The system of the disclosure also includes the second queues 26 and 126 by which passengers gain access to the passenger checkpoints 22 and 122 respectively without waiting in a line and thereby avoid the first queues 24 and 124. In one or more embodiments of the system, the system includes first validators 32 and 132 for validating the right of a passenger to receive an assigned time to access the passenger checkpoints 22 and 122 respectively via the second queues 26 and 126.

In the same embodiment as illustrated in FIG. 1B, the system includes first validators 32 and 132 validating the right of a passenger to receive an assigned future time to utilize the second queues 26 and 126 and second validators 34 and 134 respectively for permitting the passenger to access the passenger checkpoints 22 and 122 at a future time via the second queues 26 and 126. In this manner, the passenger can avoid the first queues 24 and 124.

In operation, a passenger utilizes the first validators 32 and 132 to obtain an assigned time in the future for accessing the passenger checkpoint via the second queues 26 and 126. At the same time, the system validates the passenger to use the second queues 26 and 126 through the first validators 32 and 132 respectively, and assigns a second time in the future for accessing the passenger checkpoints 22 and 122 via the second queues 26 and 126 respectively. As described below, in one embodiment, an entitled or "validated" passenger may be issued a pass which includes a time or time range or a specified time window to access the facilities at which the passenger is entitled to return and utilize the passenger checkpoints. The amount of time between the time a pass is issued and the time at which the passenger can utilize the passenger checkpoint depends on a number of factors, including the number of people who have already obtained passes, the capacity of the passenger checkpoint, the operating speed of the passenger checkpoint, staffing availability, the capacity of the passenger checkpoint allocated to the passengers accessing it via the second queue, and any delays related to operation of the passenger checkpoint or served by the passenger checkpoint and the predicted passenger departure time.

When the assigned time or time range (such as that indicated on the AIRPASS) occurs, the passenger is entitled to access the passenger checkpoints without waiting in line. The passenger accesses the second queues 26 and 126 and establishes entitlement to access the passenger checkpoints 22 and 122 via the second queues 26 and 126 respectively. In one embodiment, the passenger presents the issued pass at the second validators 34 and 134 and if the pass is valid, i.e., the time or time range is appropriate, the pass is not counterfeit, etc—following the passenger is admitted to the passenger checkpoints 22 and 122. After which, the passenger accesses the second queues 26 and 126 and establishes entitlement to access the passenger checkpoints 22 and 122 via the second queues 26 and 126. Thus, if access to the second queues 26 and 126 is secured, validation occurring via first validators 34 and 134 may not be required.

The system includes first queue wait time generators 31 and 131 associated with displays 33 and 133 respectively. The first queue wait time generators 31 and 131 are configured to generate an algorithm that associates the time issued by generators 31 and 131 into a wait time generation for the associated displays 33 and 133. The first queue wait time generators 31 and 131 are configured to generate a time regarding the wait associated with accessing the passenger checkpoint 22 and 122 via the first queues 24 and 124 respectively by a passenger about to enter the first queues 24 and 124. If the passenger is going to utilize the first queue 124, a second time is also generated for return to the first queue 124. Of course, the wait times may be calculated manually, such as by tracking the wait time of one or more particular passengers through the first queue 24 from time of entry until time of passenger checkpoint access and through the first queue 124 from time of entry until time of passenger checkpoint access or in total. In one or more embodiments, the first queue wait time generators 31 and 131 include sensors which provide data for use by the generators 31 and 131 in determining a current length of the wait associated with that line. The sensors may provide information such as the physical length of the line. The generators 31 and 131 may use this information and information such as the current passenger checkpoint capacity, percentage of capacity allocated to passengers accessing via the second queues 26 and 126, and other factors for generating an approximate second queue wait times respectively for the second queues 26 and 126. Various data for use by generators 31 and 131 may be input manually as well. For example, a passenger checkpoint operator may visually estimate the physical length of a line and input line length data to the generators 31 and 131. The first queue wait time displays 33 and 133 are configured to provide a passenger at the point of decision with the first queue wait time information. The first queue wait time displays 33 and 133 may comprise a digital or other display for displaying hours and/or minutes of wait time.

The system includes second queue wait time displays 35 and 135. These second queue wait time displays 35 and 135 are configured to display the next time, which will be assigned to a passenger for accessing the passenger checkpoint 22 and 122 through the second queues 26 and 126. These second queue wait time displays 35 and 135 may comprise a digital or other display displaying hours and/or minutes of wait time.

Using the information regarding the access times available to a passenger via the first queue displays 33 and 133 and the second queue displays 35 and 135 respectively, a passenger is aided in the process of deciding to access the passenger checkpoints 22 and 122 through the first queues 24 and 124 or the second queues 26 and 126 respectively.

In yet another embodiment for processing passengers at an airport, there are multiple passenger checkpoints. The multiple passenger checkpoints are assigned based on a dynamically changing capacity for handling processing passengers arriving at or departing from an airport. A first set of lines is provided for the passengers to be processed through a control point on the basis of first-in first out. Each line of the first set of lines is associated with a variable related to a passenger and each line of the first set of lines has a variable that is distinctive from each other line. The variables, for example, include: delays, cancellations, available security checkpoints, staffing, shift changes, security sensitivity level, travel due to time of year, travel due to time of day, ticketed capacity and walk-up travelers, flight departure times, flight arrival time, class of service based on ticket purchased, and baggage handling. A second set of lines for passengers to be processed through a control point on a non first-in first-out basis, wherein each line of the second set of lines is related with at least one variable of the first set of lines. An algorithm determines the likely line load related to a number of passengers in the first set of lines at a selected time and thereby determining a number of spaces available to allocate to the second set of lines.

Figure 2:
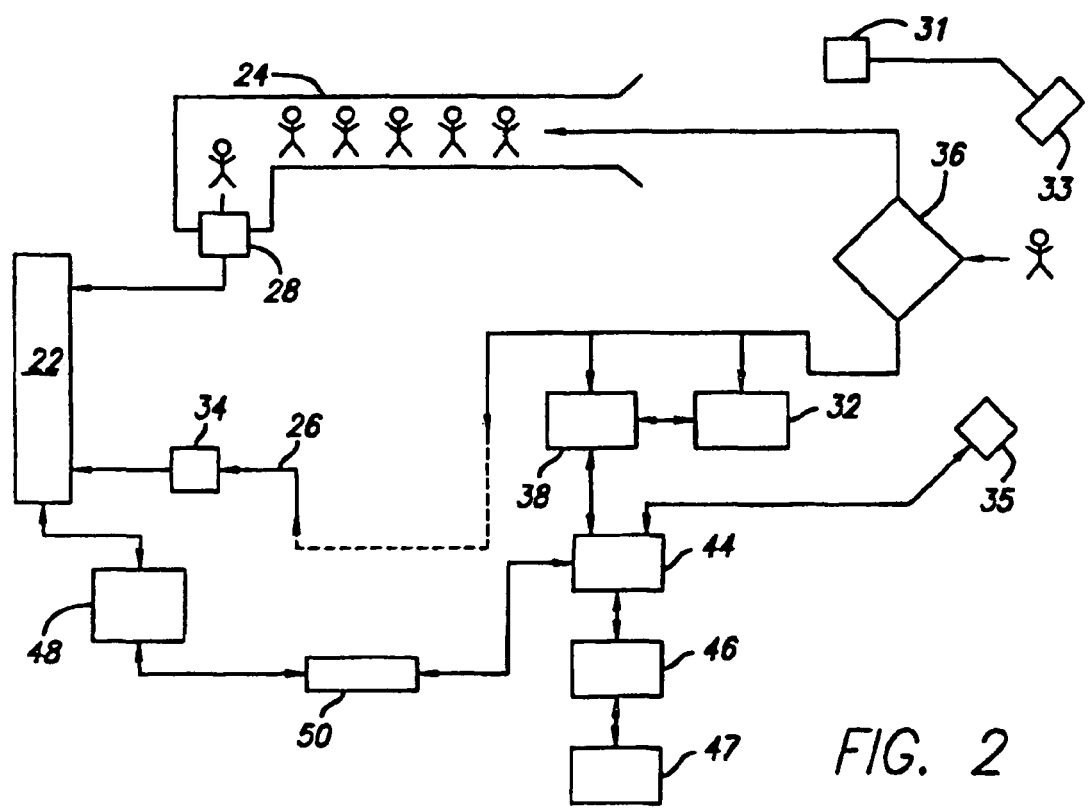
FIG. 2 illustrates in more detail a system such as that illustrated in FIGS. 1A and 1B.

FIG. 2 illustrates one embodiment of a system having a first validator 32, a media distributor 38, and a second queue 26 having an associated second validator 34. The first validator 32 is arranged to determine or verify that a passenger is entitled to an assigned future time for accessing the passenger checkpoint via the second queue 26. In one embodiment, the first validator 32 establishes the right of a passenger to a pass having an assigned future time, the pass for use by the passenger in gaining access to the passenger checkpoint 22 via the second queue 26 at the future time. The first validator 32 may comprise a card-reader type device, which is arranged to read a magnetic stripe at a ticket issued to the passenger. In such an arrangement, each passenger may be provided with a ticket or similar element, which establishes a passenger's right to access the passenger checkpoint 22.

In an embodiment where the passenger checkpoint 22 is located in or as part of an airport, the ticketed passenger uses the ticket, which is issued to the passenger, to gain access to the preference line itself. In such an arrangement, the first validator 32 may be arranged to communicate with a main database containing information regarding the passenger(s), such as by ticket numbers, which are entitled to utilize the second queue 26.

The first validator 32 may be arranged to read input from a keypad, information a card, to accept issued tokens, identify one or more biometric identifiers of a passenger such as a radio-frequency identification (RFID); retina, voice, thermal, finger or hand geometry signature; or a visual identification of the passenger or the like.

If the first validator 32 establishes the right of the passenger to an assigned time in the future for accessing the passenger checkpoint via the second queue 26, then the media distributor 38 distributes a pass to a passenger which the passenger may utilize to access the passenger checkpoint via the second queue 26. In one embodiment, the media distributor 38 comprises a printer, which prints a paper pass or similar element. The media distributor 38 may issue one or more of a wide variety of media as passes, such as magnetic-stripe encoded or "smart" cards, punch-type cards, coded tokens, barcode, infrared signal, or biometric identifiers such as those set forth above and the like. In another embodiment, the media distributor 38 prints and distributes multiple passes based on a specified time window associated with departure time from an airport. In yet another embodiment, the media distributor 38 prints and distributes multiple passes based on multiple passenger requests for multiple airlines.

The pass, which is distributed to each passenger by the media distributor 38, is arranged to permit the passenger to gain access to the passenger checkpoint 22 at a time in the future. The particular time, as described below, may vary upon a wide variety of circumstances. The time comprises an assigned access time or time range, which is printed on the pass, which is issued to an entitled passenger. In the examples below, the pass is referred to as having a "time" associated with it. It will be understood that this contemplates: a specific time and/or a time range, time period, and time window.

The first validator 32 and the media distributor 38 may be located adjacent to the passenger checkpoint and/or remote therefrom. In the event the first validator 32 and media distributor 38 are located near the passenger checkpoint, after obtaining a pass or the like, the passenger may leave the area of the passenger checkpoint 22 and need not return to the passenger checkpoint 22 until the time provided on the pass. In the event the passenger obtains a pass from a remote media distributor 38, the passenger simply continues about their activities until it is necessary to go to the vicinity of the passenger checkpoint at the assigned time. As described in more detail below, the right of a passenger to obtain passes may be a value added feature for which the passenger pays additional monies, such as at the same time as purchasing a main ticket, such as an airline ticket.

The first validator 32 may be integral with a main ticket issuer/validator and second queue access passes may be issued at the same time or as part of a main ticket. For example, a passenger entering an airport may be permitted, at the time they present or purchase their ticket, to obtain one or more passes providing future times assigned by the system. This permits a passenger to plan or schedule ahead of time. In this arrangement, the ticket which the passenger uses to access the airport may be encoded and/or printed with access time information for permitting the passenger to access one or more facilities at future times, avoiding the need to issue separate passes.

The system and method for permitting access to the passenger checkpoint 22 includes a second validator 34 for establishing the right of a passenger to access the passenger checkpoint via the second queue 26 at assigned time. In one embodiment, the second validator 34 validates the media or pass issued by the media distributor 38 and held by a passenger. In one or more embodiments, the second validator 34 comprises a human attendant which reads information printed on the pass and verifies the information. The attendant may verify the printed assigned time or time range against the current time, a date of the pass against a current date, and the passenger checkpoint for which the pass is issued.

Alternatively, the second validator 34 may comprise a card reader or other device for confirming the entitlement of a passenger to access the passenger checkpoint 22 via the second queue 26. For example, the second validator 34 may be arranged to verify data associated with the element issued by the media distributor 38, such as a barcode or infrared signal.

The pass issued to a passenger may be issued only for reference by the passenger for knowing and remembering the assigned time or range of time, and the second validator 34 may be configured to verify entitlement of the passenger in a manner independent of the pass. For example, a passenger may establish entitlement to a pass with a fingerprint, RFID, bar code or other personal biometric data, at the first validator 32. The pass provides written indication of the assigned time to the passenger. When the passenger accesses the second queue 26, the passenger may be required to establish validation of the second validator 34 with a fingerprint, RFID, bar code or other personal biometric data, again. In this arrangement, the second validator 34 determines that the passenger is entitled to access the passenger checkpoint by establishing that the identify of the passenger with the fingerprint and determining if the time the passenger is accessing the second queue 26 is at the time/in the range of time which was assigned to the passenger. It may be appreciated that the second validator 34 may be configured to establish validator in one or more of the variety of manners described above with respect to the first validator 32. It should be appreciated that passengers may not be issued passes at all.

One or more schemes are provided for determining the access time, which is associated with each media, which is issued by the media distributor 38. A time at which a passenger is permitted to gain access to the passenger checkpoint 22 via the second queue 26 is dependent upon one or more of a variety of factors, including, but not limited to, the following: the capacity of the passenger checkpoint, the capacity of the passenger checkpoint which is allocated to passengers accessing through the second queue 26, the total number of passengers who may wish to access the passenger checkpoint 22, the current and future staffing of the passenger checkpoint, the demographics of the passengers, the time of day and the day of the week.

The system includes a controller 44. As illustrated, the controller 44 is arranged to control the media distributor 38. The controller 44 may also be arranged to control other aspects of the system, such as the first validator 32. In one or more embodiments, the controller 44 receives passenger checkpoint capacity and/or time information and instructs the media distributor 38 what time to issue in association with each pass. The controller 44 may send a signal to the second queue time display 35 for displaying the next time to be assigned.

A keypad 46 or other data entry/control device, such as a keyboard, mouse, joystick or the like, may be provided for manually entering data and controlling the controller 44. The keypad 46 may be used to enter specific time information, reset the controller and the like. A display screen 47 such as a CRT may be associated with the controller 44 and keypad 46 for permitting a user to view information regarding the system.

A local server 48 is arranged to send and receive data. The local server 48 is arranged to receive data about the capacity and other characteristics of the passenger checkpoint 22. For example, various sensors may be associated with the passenger checkpoint 22 for providing data. In one or more embodiments, the sensors not shown may monitor passenger checkpoint speed, the number of passengers passing through or standing in the first queue 24, the capacity of the passenger checkpoint, etc. The local server 48 may receive data from these sensors at various times or continuously, or may transmit specific requests for data. In other embodiments, the local server 48 may be a remote server in communication with the passenger checkpoint and sensors.

Information may be inputted manually or automatically. For example, each staff member currently available to operate a passenger checkpoint may manually enter their employee code to indicate to the system that they are available to operate the system. Based on the number of employees, which are indicated as available, adjustments may be made to the number of passengers, which are likely to be serviced during a period of time.

As will be appreciated by those of skill in the art, many current facilities, already include sophisticated facility control systems. These systems have a variety of sensors and controls for monitoring and controlling the passenger checkpoint. The local server 48 may simply comprise an interface with the individual passenger checkpoint control systems for receiving information therefrom.

The information provided to the server 48 is transmitted to an algorithm processor 50. The algorithm processor 50 utilizes the data to determine times for issuance by the media distributor 38. In general, it is desired that the algorithm processor 50 issue a time associated with each media which permits the passenger to return to the passenger checkpoint 22 at the predetermined time at the second media validator 34 and access the passenger checkpoint 22 such as via the second validator 34 without standing in a line. In order to accurately balance demand and capacity, the algorithm processor 50 obtains information regarding a variety of factors, which affect demand and capacity. In another embodiment, the algorithm provides coupons for merchandise or for food discounts. Although shown as separate entities in FIG. 2, the controller 44 and algorithm processor 50 may be implemented as a single device or process.

If the wait associated with the first queue 24 becomes later than a desirable time, then the algorithm processor 50 may be arranged to issue fewer numbers of access times or access times which are later in time so as to permit a greater number of passengers from the first queue 24 to access the passenger checkpoint 22 for a period of time. In the event the capacity of the passenger checkpoint 22 suddenly decreases, the algorithm processor 50 may be arranged to respond in a similar fashion. In the event the capacity of the passenger checkpoint 22 increases, then the algorithm processor 50 may be arranged to issue a greater number of access times. In yet another embodiment, the algorithm dynamically assigns employees for inspecting or manning security baggage or personal check areas based on predicted passenger return times.

Figure 3:
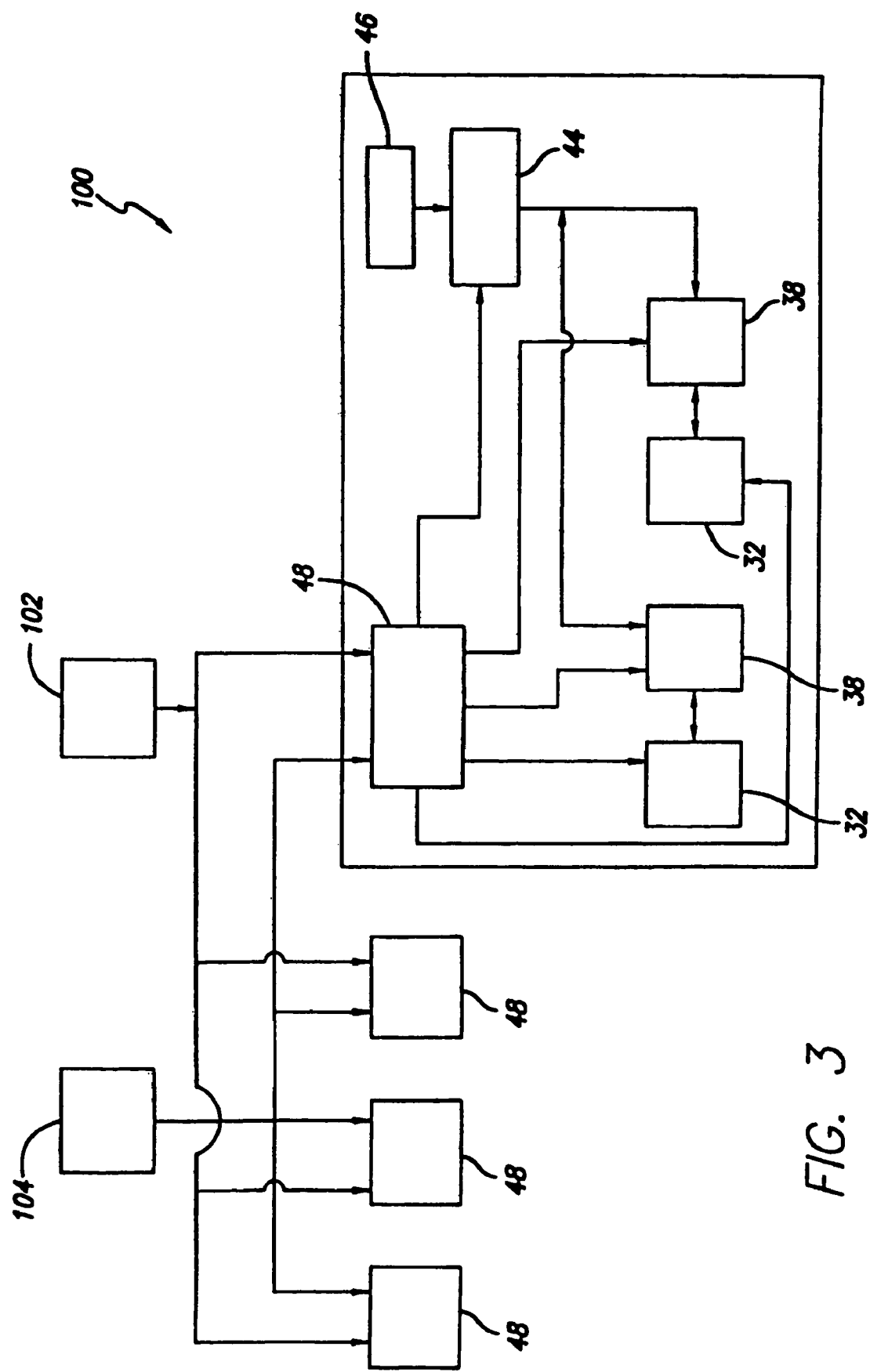
FIG. 3 illustrates a system of the present disclosure, which includes multiple systems for managing admission to multiple passenger checkpoints.

As illustrated in FIG. 3, more than one media distributor 38 and first validator 40 may be provided at each passenger checkpoint 22. More than one second media validator may be provided for permitting access to the passenger checkpoint 22.

A computing process determines the mix ratio of numbers of accesses granted to the AIRPASS access and non-AIRPASS access. Redemptions of the AIRPASS accesses are fed back to the computer system such that near real time updates of availability for further granting of accesses may be computed.

There is also the ability to permit at least one of the exchange or return of previously assigned AIRPASS accesses. Such exchange permits for updating the computation of a load of the passenger checkpoint. A non-use of an AIRPASS assignment is factored into a computation of loading.

Multiple AIRPASS and Pre-Assignment of AIRPASS

A passenger may make multiple AIRPASS requests for access to facilities. The multiple requests can be for different facilities in the environment. Multiple AIRPASS requests can be permitted to selected passengers. The multiple requests can be for different facilities in the environment. The multiple requests for different passengers in a selected group can be regulated relative to at least one or more of the levels of the hierarchy of passengers.

Figure 4:
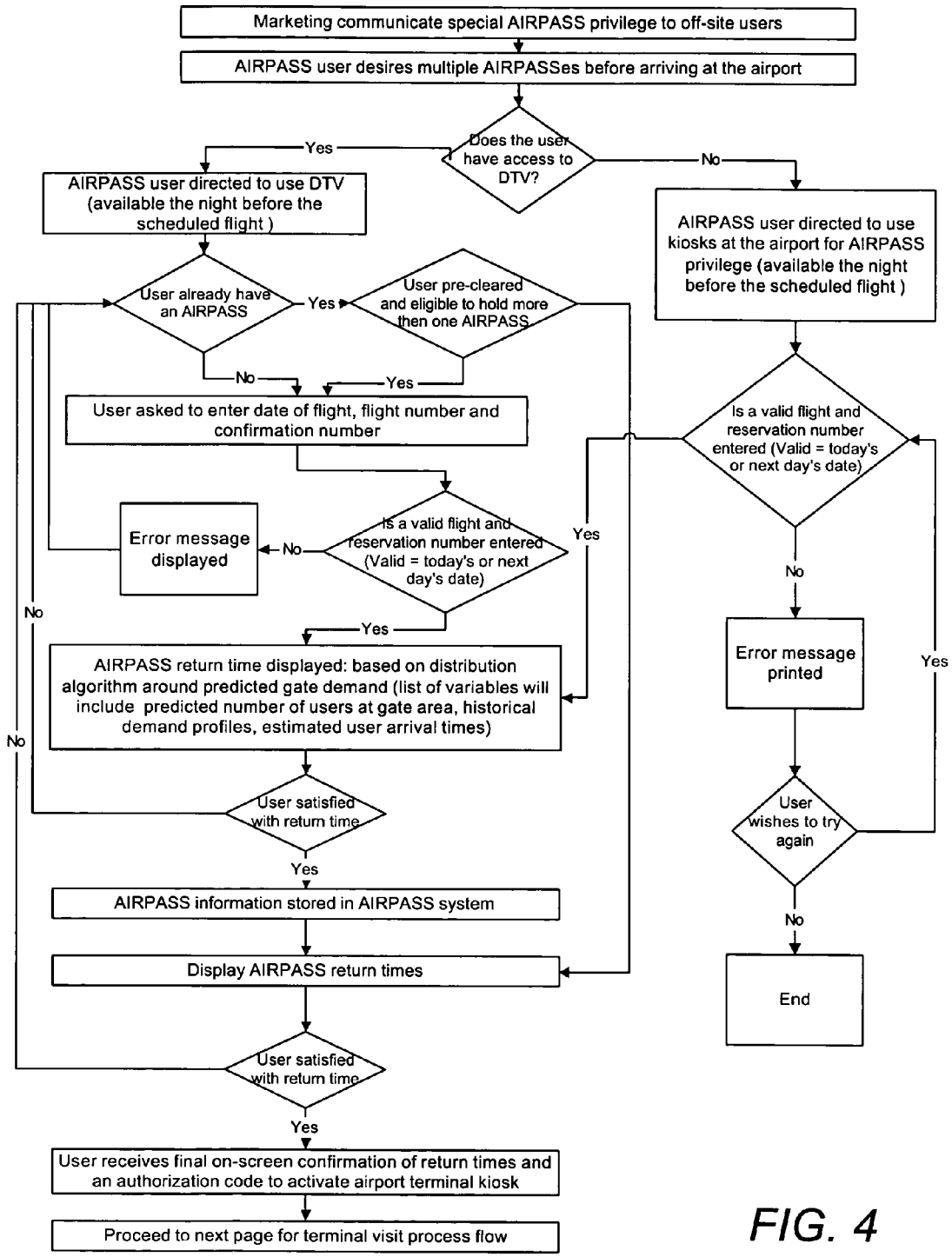
FIG. 4 is a flow diagram illustrating a management system where multiple access permissions are granted on a long-term basis, the tickets being received before visiting an airport. Access permissions can, in some instances, be a ticket.

FIG. 4 is a flow diagram of an exemplary embodiment of the present disclosure showing the ability to issue multiple AIRPASS tickets. In that example the hierarchy is based on different locations, which may be remote from the airport and also those in closer relation to the airport.

The exemplary process of FIG. 4 starts with the marketing and sales department of an organization operating in an airport environment communicating that a special AIRPASS privilege is available to passengers. This communication is transmitted preferably wirelessly, through the Internet or other network, and communicated to passengers. A passenger then indicates the desirability of multiple AIRPASS tickets before a visit to an airport.

Television AIRPASS

There is next determined whether there is an available digital TV ("DTV") or computer monitor or screen. If yes, the passenger is directed to use the DTV. This availability to use AIRPASS can be provided the night before or the day of the airport visit. If the passenger has already made a schedule, then the passenger is asked whether or not they want to start over and add to their schedule. The passenger can then be asked a series of questions related to AIRPASS.

If the passenger does not have a schedule, then the passenger is asked a series of different questions. These can relate to which airport is being attended and what time they intend to arrive at the airport. The passenger then chooses the appropriate AIRPASS tickets that are desired. Having effected that, the return time window is displayed based on a distribution algorithm around the attendance and historical demand profiles.

The passenger can be given a time slot to use the AIRPASS and different rules can be applied to AIRPASS allocation as required. If the passenger is satisfied with the time, the passenger is given the option of choosing whether the passenger checkpoint is for all passengers or for selected passengers in the party. The AIRPASS ticket would then be stored in the system and can later be activated by each passenger.

The passenger can be asked whether another AIRPASS is required at the current airport on the same day for other facilities and different numbers of tickets can be issued.

The passenger can be provided with on-screen confirmation for each member of the party. Return time windows can be made available to the passenger so that the passengers as full information necessary to enable them to be informed and make appropriate decisions at whether or not to accept this schedule.

Ultimately, the passenger can receive a final on-screen confirmation and be directed to any AIRPASS location the airport to receive the multiple AIRPASS requests.

In situations where there is no DTV or computer monitor or screen, the passenger is directed to go to a kiosk for AIRPASS privileges. These kiosks can be located in a common area at a resort or a hotel associated with the resort. When the dates check out with the available dates, then the passenger is taken through a series of questions similar to that where there is a DTV in the system. If the dates do not check out, an error message is printed and the passenger can try again.

Figure 5:
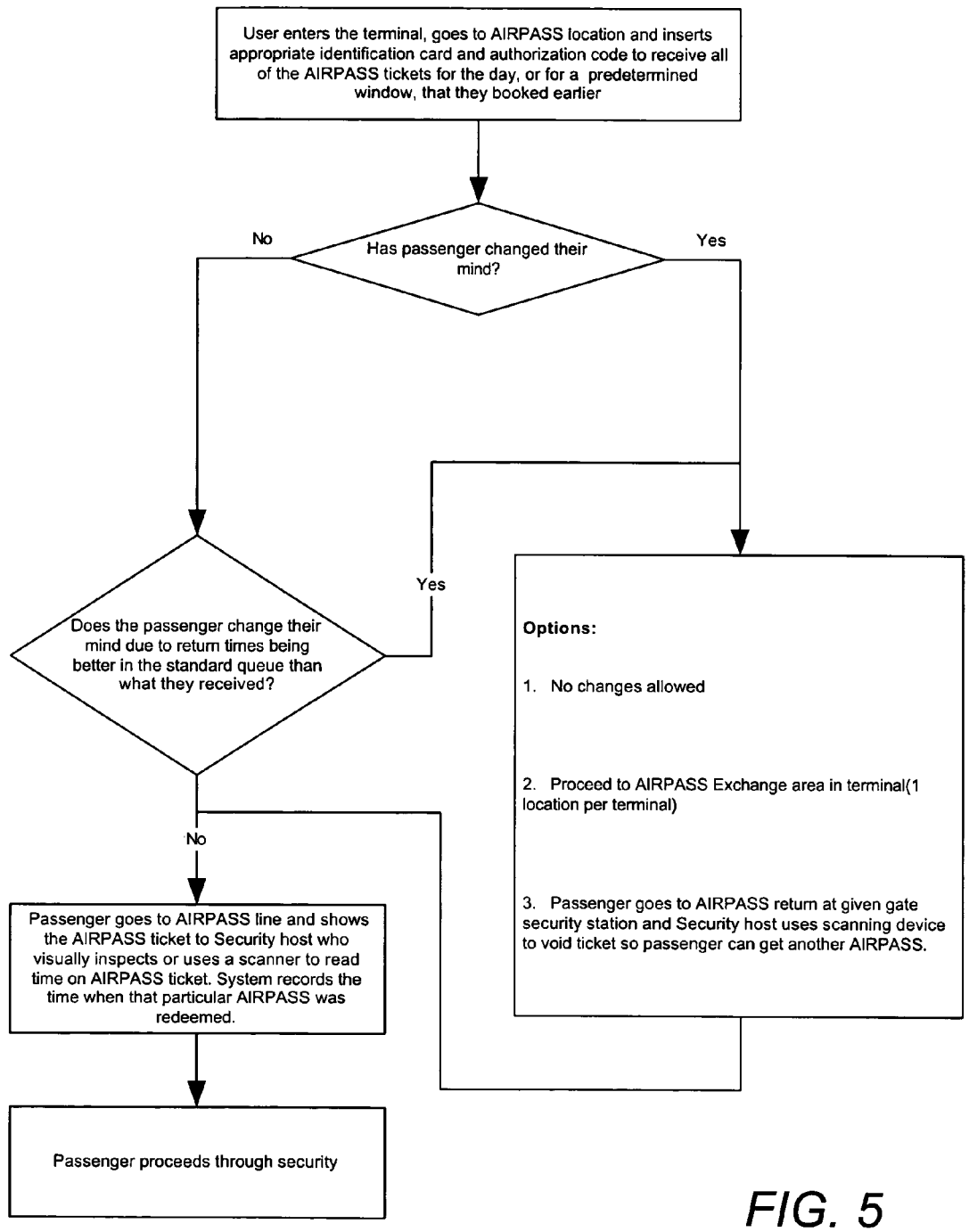
FIG. 5 is a flow diagram illustrating the management of a system where multiple access permissions are granted on a long-term basis, the tickets being obtained when visiting the airport.

The process of using the multiple AIRPASS is further described with reference to FIG. 5. The appropriate card is inserted and the AIRPASS tickets that were booked earlier are received.

The passenger is given an option to make changes and exchanges. If a passengers does not change their mind, then the passenger go to or pass through each passenger checkpoint according to the predetermined tickets that were obtained at the appropriate return time window. If a passenger changes their mind due to other facilities or due to return times being better than what they got, the passenger can go to an AIRPASS screen to give or receive options to determine whether there is a better availability.

At that screen there can be situations where no changes are allowed, or situations where passengers are permitted to exchange AIRPASS privileges. The passenger can go to an AIRPASS return at a given passenger checkpoint and a counter agent can use a barcode scanning device to void a ticket so that the passenger can get another ticket.

If a passenger has changed their mind, the passenger can go to the AIRPASS line and show tickets to the counter agent who uses the barcode scanner to read the time, and when permitted the passenger can use the passenger checkpoint. Alternatively, instead of a counter agent, the ticket can be read automatically by appropriate scanning, reader and/or sensor means.

Figure 6:
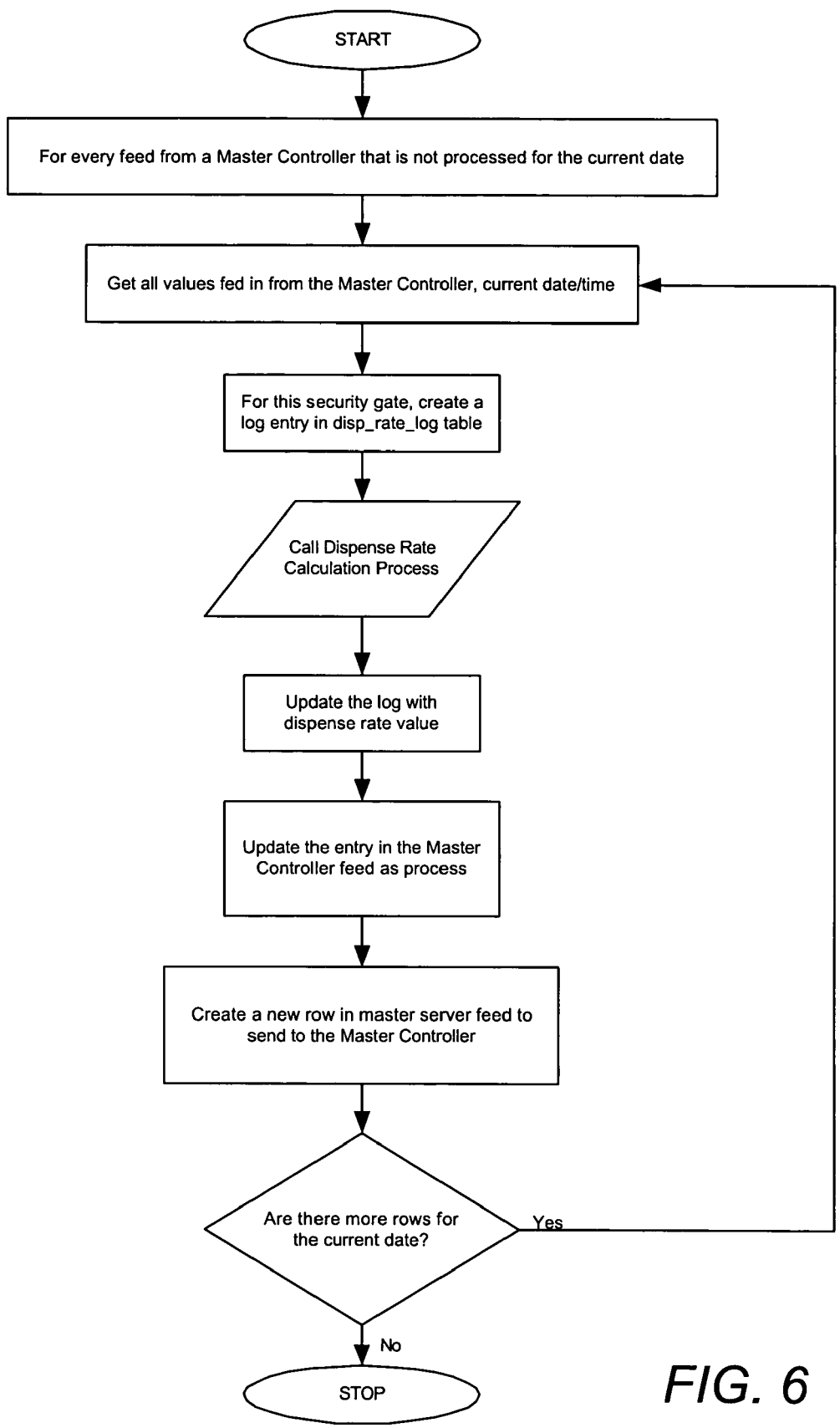
FIG. 6 is a flow diagram illustrating an embodiment of the disclosure where information is fed from a master server to a controller of an embodiment of the disclosure.
Figure 7A:
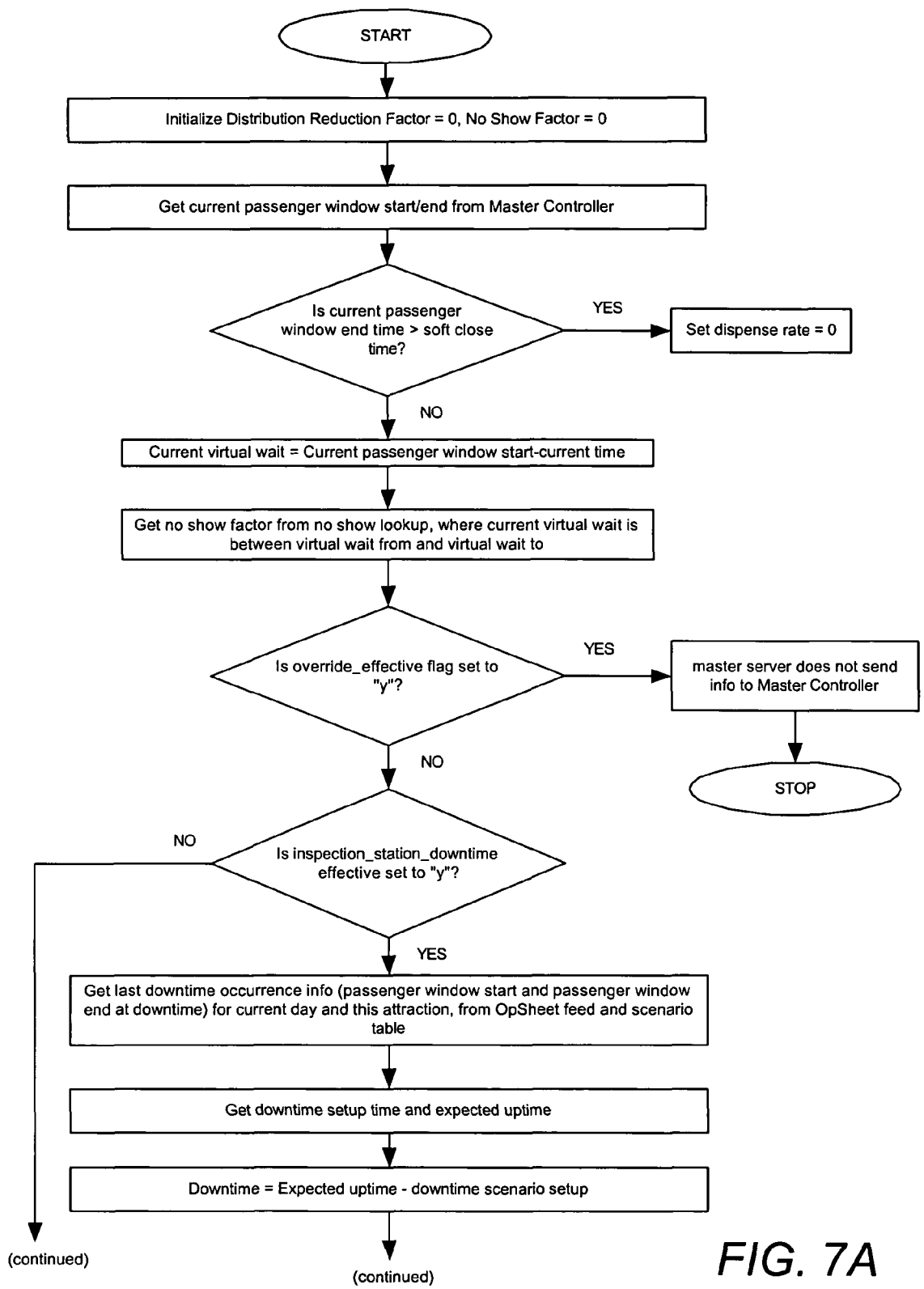
FIG. 7A to 7C show a flow diagram illustrating a method of the disclosure by which information is fed from a controller to a master server of an embodiment of the disclosure.
Figure 7B:
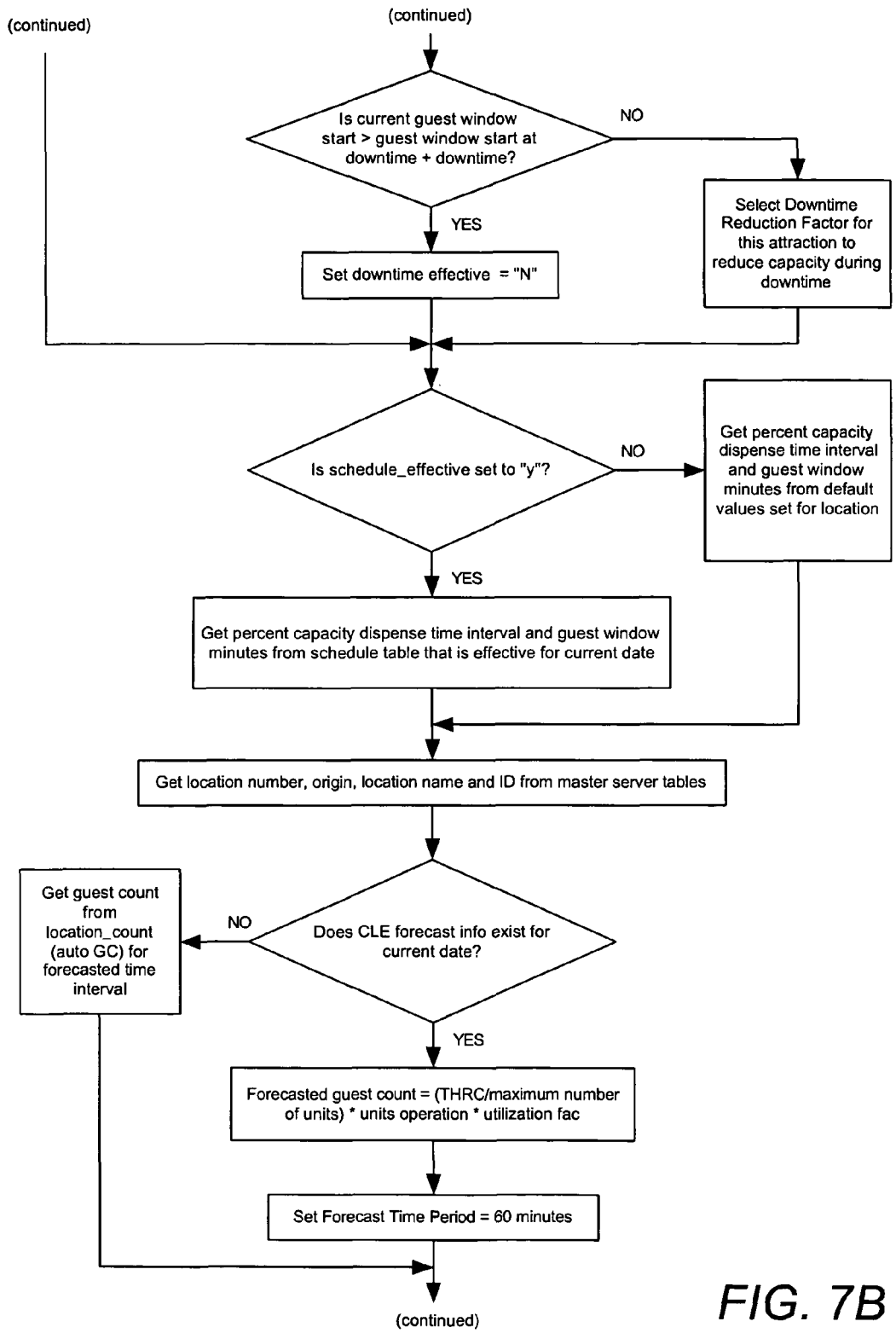
Figure 7C:
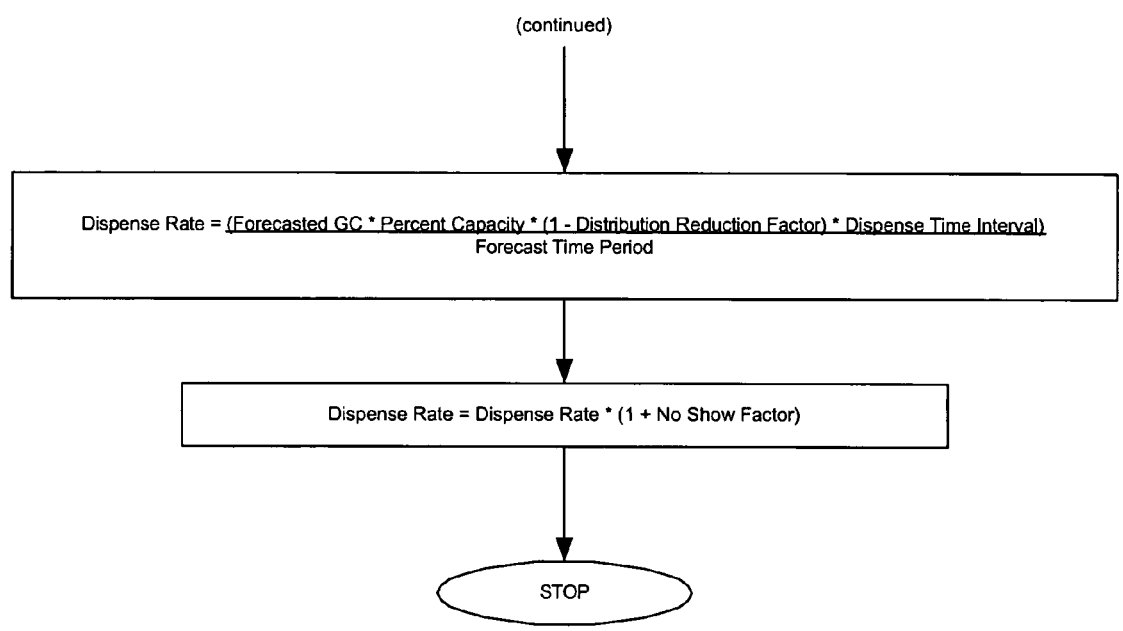

FIG. 6 is a flow diagram illustrating a protocol by which the master server 102, referred to in the figure as the "Master Server Feed", communicates with the controller 44 of the system associated with each passenger checkpoint in one implementation associated with the information provided in FIGS. 4 and 5A-5H. FIGS. 7A-7C show a flow diagram illustrating a protocol by which the controller 44 communicates with the master server 102.

Figure 8:
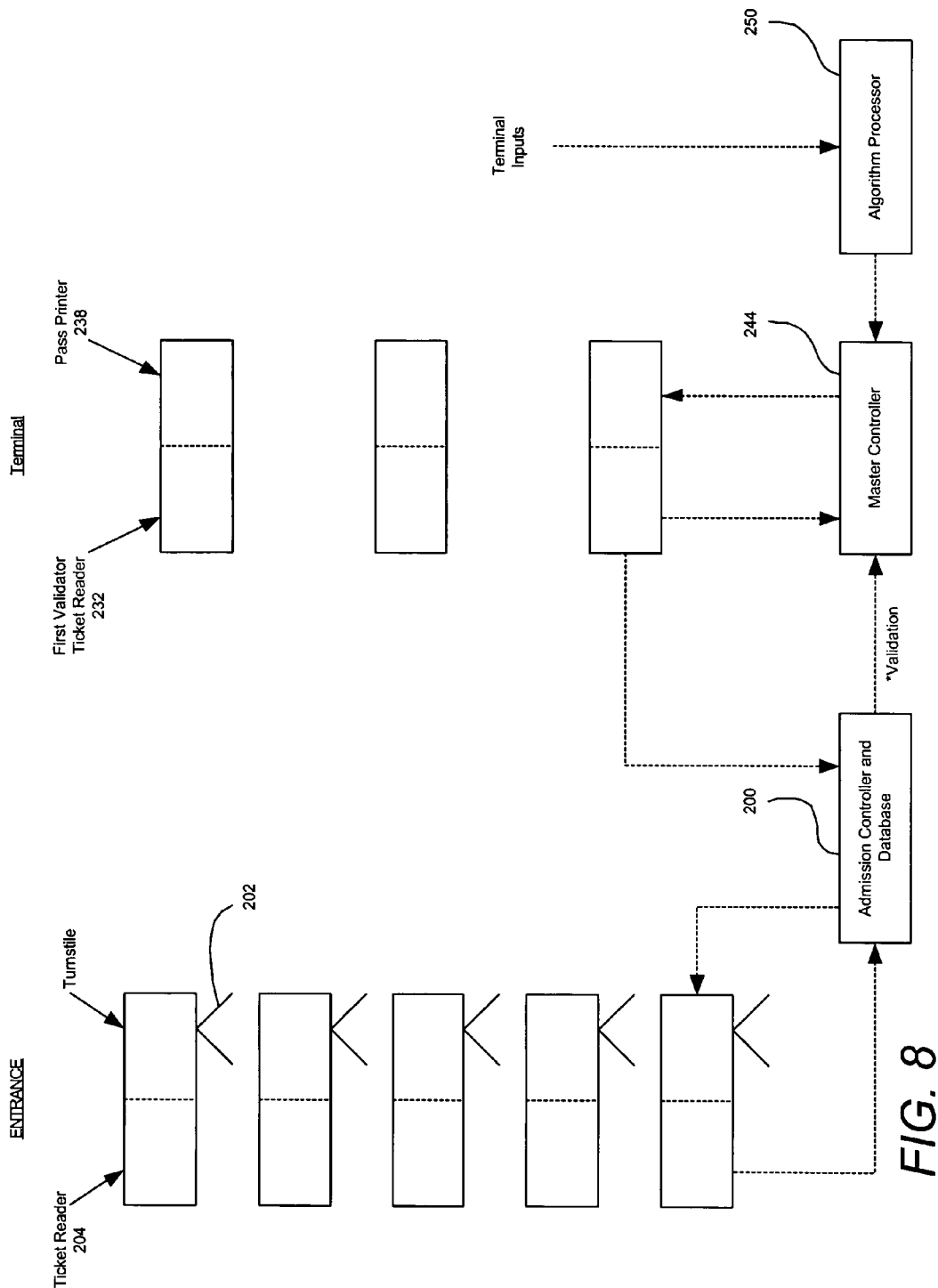
FIG. 8 illustrates a system in accordance with another embodiment of the disclosure.

FIG. 8 schematically illustrates a system in which validation of airport entry tickets and establishment of the entitlement of a passenger to access the second queue 26 is centralized. In this embodiment, a passenger obtains a ticket, whether pre-purchased or purchased on the gate. A central airport admission controller and database 200 stores information regarding valid tickets. A passenger is permitted to enter the airport passenger checkpoint via a turnstile or gate 202 or other monitored entry when the passenger's ticket is validated. For example, the passenger's ticket may be read by a ticket reader 204 and the data thereon verified by the airport admission controller 200 against the stored ticket information.

When a passenger wishes to obtain an assigned time to access a second queue 26 of a passenger checkpoint 22, the passenger establishes an entitlement via a first validator 232. The first validator 232 communicates with the central airport admission controller 200 via a master controller 244. This arrangement permits a determination that the passenger's ticket is valid for a specific day, has not been revoked or the like. If the ticket is validated, then the passenger may be provided a pass, such as described above, by a media distributor 238. The master controller 244 is also arranged to send data to the central airport admission controller 200 that a pass has been issued to the passenger for that passenger checkpoint. Then, if the passenger attempts to gain a pass for that or another passenger checkpoint while the first pass is outstanding, the database associated with the airport admission controller 200 has a record of the outstanding pass and the passenger will be denied the additional pass.

In another embodiment, the master controller 244 queries a database having stored selected user profiles. The master controller 244 captures a number of requests for the second line. During the request, the master controller 244 obtains terminal information and an assigned return time for the passenger. The master controller 244 permits notification to security personal if a passenger request matches an unwanted user profile. In yet another embodiment, the master controller 244 controls conditions and schedules for employees scheduled to man baggage or personal check areas whereby status information relating to status or changes are displayed in real-time on a status board. In another alternative of this embodiment, the status information relating to status or changes is automatically transmitted to employees by a wireless device.

Again, an algorithm processor 250 is arranged to communicate with the master controller 244 to provide times to be assigned and printed by the media distributor 238.

In one or more embodiments, the system may be arranged so that not all passengers are entitled to access the passenger checkpoint 22 via the second queue 26. In another embodiment, one or more passengers may be permitted to access certain facilities via the second queue 26 and other facilities only via the first queue 24. In one or more embodiments, only passengers which pay a premium amount or obtain some special entitlement are permitted to access one or more facilities via the second queue.

Operation, Effect And Other Features

In operation, in one or more embodiments, a passenger receives a ticket or other entitlement. For example, at an airport, a passenger pays for a ticket to gain a seat on a flight. With respect to the embodiment of the disclosure illustrated in FIG. 3, the main server 104 stores information regarding the passenger's ticket.

At some point a passenger may wish to access a particular passenger checkpoint 22. When the passenger reaches the passenger checkpoint 22, they are presented with an option. First, the passenger may access the passenger checkpoint 22 through the traditional first queue 24. Optionally, the passenger may access the passenger checkpoint 22 via the second queue.

Figure 9:
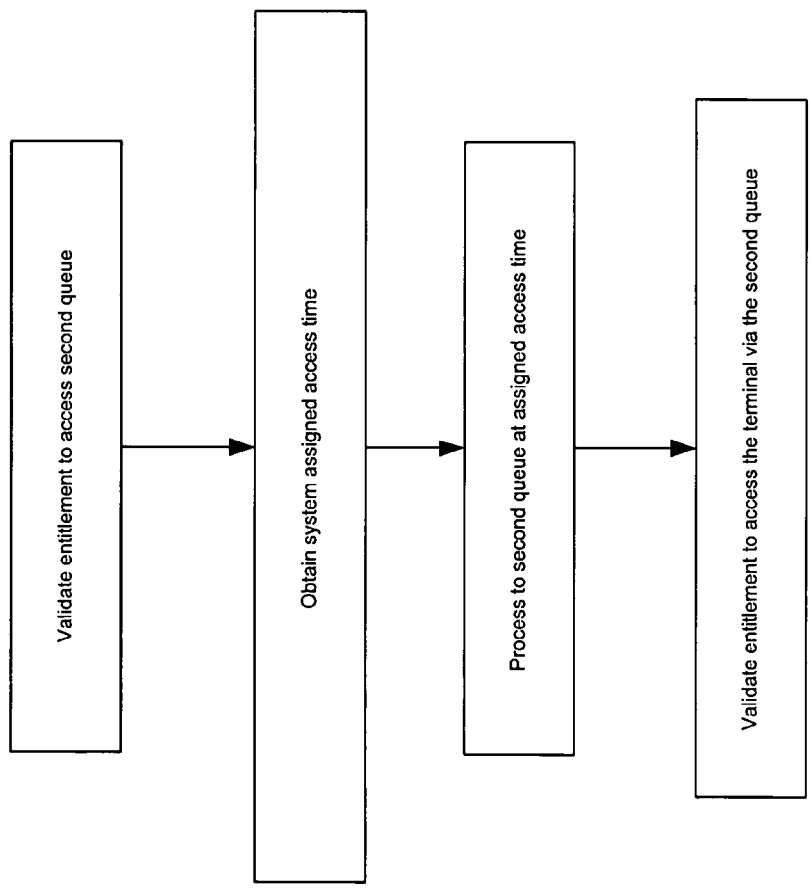
FIG. 9 is a flow diagram illustrating an embodiment of a method of the disclosure.

Referring to FIG. 9, if the passenger wishes to access the passenger checkpoint 22 via the second queue 26, the passenger first validates entitlement to receive an assigned time to access the second queue 26. In one embodiment, the passenger slides a portion of his ticket through a card reader portion of the first validator 32. In one or more other embodiments, validation may be performed by scanning a fingerprint or the like as described above.

In the arrangement illustrated in FIG. 3, the first validator 32 then sends a confirmation request through the local server 48 to the main server 104. The main server 104 verifies that the ticket is on the list of valid tickets. If the ticket is not verified, then the main server 104 sends this data back to the first validator 32 which may illuminate or print out an indication of such to the passenger. In an embodiment where the passenger is not entitled to more than one pass or entitlement to the second queue 26 at a time, the first validator 32 is configured to verify that the passenger has no other outstanding entitlements/passes.

In one embodiment, such as in the system illustrated in FIG. 2, if the ticket is verified, the first validator 32 sends a signal of such to the media distributor 38. The media distributor 38 then issues a pass to the passenger. The pass includes an assigned access time at which the passenger is entitled to return to the passenger checkpoint 22 in the future and access the passenger checkpoint 22 through the second queue 26.

The passenger may then leave the area of the passenger checkpoint 22. During this time, the passenger may engage in a wide variety of other activities.

At the appointed time, the passenger returns to the passenger checkpoint 22 and seeks access to the passenger checkpoint via the second queue 26. The passenger establishes entitlement to access the passenger checkpoint 22 via the second validator 34. In the embodiment where the passenger is provided with a pass which provides access, the passenger presents the issued pass to a person who verifies the current time and the time printed on the pass, the date of the pass and the passenger checkpoint for which the pass provides access. If validated, then the passenger is permitted to access the passenger checkpoint 22. As provided above, the passenger may establish entitlement to access the passenger checkpoint 22 in accordance with other methods, such as by scanning a fingerprint again.

In one or more embodiments, the passengers gaining access to the passenger checkpoint 22 through the first and second queues 24 and 26 respectively may be separated. In one or more embodiments, the passengers gaining access to the passenger checkpoint 22 are integrated in accordance with the allocated capacity to the first and second queue passengers.

In one or more embodiments, one or more passengers may be permitted to access a passenger checkpoint 22 via the second queue 26 apart from the standard method of establishing entitlement at the first validator 32 and then returning to the second queue 26 of the passenger checkpoint 22 at the assigned time. For example, one or more passes may be issued to a number of passengers which include pre-assigned times. One or more passengers might, for example, be issued passes on the same day or days or weeks before the assigned date of access. A passenger arranging a trip to an airport may be permitted to purchase passes. In one or more embodiments, these assigned "spots" are accounted for by the system when determining other passes to issue to those accessing the passenger checkpoint 22 with the first validator 34.

In one or more embodiments, one or more passengers may be permitted to access a passenger checkpoint 22 via the second queue 26 or even a third queue without a pass. For example, special VIP, disabled or other passengers may be permitted to access the passenger checkpoint via the second queue 26 or a third queue which permits the passenger to access the passenger checkpoint at any time.

As described above, in one or more embodiments of the system and method, a passenger is prevented from obtaining more than one entitlement or pass for accessing a passenger checkpoint at a single time. In another arrangement, some passengers may be permitted to obtain multiple passes. In one embodiment, the system may be arranged to permit passengers to obtain multiple passes at some times and not at others. For example, if the wait time for accessing one or two facilities is particularly long (whether by the first or second queue 24 and 26 respectively), the system may be arranged to permit passengers to obtain passes for different facilities so that the passenger avoids the need to access one passenger checkpoint before obtaining a pass for accessing another passenger checkpoint.

Advantageously, the method and system of the present disclosure permits one or more passengers to gain access to a passenger checkpoint without having to wait in a standard line to access the passenger checkpoint. This permits the passenger to engage in other activities instead of waiting in line.

In one or more embodiments, the method and system advantageously permits "real-time" adjustment of the flow of passengers to the passenger checkpoint 22 via the first and second queues 24 and 26. This is advantageous since it permits optimization of the capacity of the passenger checkpoint with the demand of passengers. In the event the line of passengers in the first queue 24 becomes excessively long, the system can provide for an adjustment in the number of passengers permitted to access the passenger checkpoint 22 via the second queue 26 and thus reduce the wait time associated with the first queue. In addition, in the event the capacity of the passenger checkpoint 22 suddenly decreases, the system can provide for an adjustment in the number of passengers and/or access times via the second queue 26 to prevent a build up of passengers accessing the passenger checkpoint 22 via the first and/or second queues 24 and 26. In the event the capacity of the passenger checkpoint 22 increases, the system can provide for an additional number of passengers to access the passenger checkpoint 22 via the second queue 26 and/or adjust the access times to permit more passengers to access the passenger checkpoint.

Hierarchal and Remote Access Structures and Multiple AIRPASS Characteristics

Hierarchal Structure

The disclosure also provides for managing admission to a passenger checkpoint where there is a hierarchical structure for passengers using an AIRPASS basis set by the hierarchal system. Patrons in the hierarchy are permitted access to a first passenger checkpoint based on where they fall in the hierarchy. For example, those visitors staying in a partner hotel may be granted a higher AIRPASS than other passengers.

A request for an allocation of a space at the first passenger checkpoint includes the steps of:

I. receiving an input from a passenger at a remote location. The input is communicated to a central computer for requesting access to an passenger checkpoint;

ii. allocating available return times in relation to the level of a passenger in the hierarchy;

iii. transmitting the available return times for the first passenger checkpoint to the passenger at the remote location; and iv. permitting the passenger to effect a choice of a selected available return time.

The hierarchy in one format is determined on the basis of those remotely located from the airport environment when making an AIRPASS request and those located at the airport environment making the AIRPASS request.

The advantages of the hierarchal aspects of the disclosure are described in relation to Segmentation, Patron Value Features, Models, Exchange, Distribution, Redemption, and Technical Features.

Segmentation

Different hierarchal models can be established for the ability and right to obtain and use the AIRPASS according to different priorities.

1. Passenger.
    a. Spending per passenger on airlines or hotels or other consumer services or products can determine different hierarchies of access to AIRPASS. Thus, the more that is spent by a passenger, the higher the hierarchy can be for AIRPASS.
    b. Hotel accommodation related resorts and environments associated with the airport center are allocated different priorities. Where a passenger is in hotel signed up with the AIRPASS program, a higher hierarchy can be given.
    c. Different levels and hierarchies can be applicable at different hotels. Thus, more luxurious hotels can have higher priorities.
2. Seasonal differences can be factored into the grant of different privileges. Accordingly, special promotions for AIRPASS can be provided according to the season.

Patron Value Features

By providing remote access at different early times, there can be different advantages and benefits.

1. Early AIRPASS Access.
    a. There is the ability to offer passengers early access to AIRPASS via their in-room TV, (DTV or hotel kiosk), to select the facilities for an AIRPASS.
        I. The ability to obtain this access may be variable, such as the night before, day of, or prior to the airport visit.

b. Pre-Arrival.
  I. The AIRPASS may be obtainable via the WEB from a remote location such as a home computer.
    1. The AIRPASS may be supplied as printed paper tickets.
    2. The AIRPASS may be supplied electronically and wirelessly through a download to a PDA or cellular telephone.
  2. Multiple AIRPASS accesses for passengers is possible.
    a. Each passenger at a hotel is able to select the same or a separate AIRPASS as others in the room.
    b. The ability to offer different numbers (i.e., more than 3, could be variable) of AIRPASS based on segmentation.
  3. There is the ability to offer premium times based on segmentation.
  4. There is the ability to let segmented passengers have first chance to certain inventory.
  5. There is the ability to allow passengers with entitlements to choose an AIRPASS for a second or other airports on the same or other days.
  6. There is the ability to issue a concurrent AIRPASS for the day passenger (with long virtual waits).

Models

The attendance and use profiles can be fed into the computer system to provide advantages for modeling and planning the flow of passengers in the airport facilities and venue.
  1. There is the ability to forecast return times so as not to disadvantage the day passenger. This is to minimize the impact to Day Patrons, and on first in first out passengers.
  2. There will be better inventory control through more information driving the inventory availability is possible. These include.
    a. The ability to dynamically change/tune the algorithms to maximize yield by adding factors to the model.
      I. as they are discovered.
      ii. made available in an automated fashion (e.g., no-shows, weather forecast feeds, current resort occupancy, current or projected airport loads, passenger checkpoint capacity, etc.).
    b. The ability to dynamically change availability for resort and day passengers.
    c. The ability to adjust by day which facilities is offered.

Exchange

1. Patrons are able to exchange AIRPASS once inside the airport.
  a. For a different passenger checkpoint.
  b. Patrons are able to exchange for same passenger checkpoint, new time, if available.
  c. The exchange should come from the global inventory and add back the ticket they are exchanging.

Patrons AIRPASS Distribution

1. AIRPASS location in the airport can be.
  a. Any selected locations.
2. In resort or accommodation associated with the airport.
  a. Kiosk in lobby.
  b. Delivered to room.
  c. At front desk.
3. Cell phone, pager, smart toy, PDA, or/other New Technology.
4. Linked to a priority or allegiance card.
  a. priority or allegiance cards, whether or not they have ticket media, should be recognized by the system.

Redemption

1. Automatic redemption, for instance by RF-ID, magnetic swipe, barcode, is possible. Characteristics include any one or more of:
  a. Real-time, or near real-time, add back to inventory when there is a no-show.
    I. Prior patterns related to a passenger are added to historical basis of information.
  b. Patron redemption at the point of entry to the passenger checkpoint or airport area.
  c. Post entry by a person at a passenger checkpoint.
  d. This links back to the entitlement for tracking/reporting.
  e. Centaure clocks with the ability to display information other than return and wait-times (Unavailable/Closed/etc. messages).

Mobile System

Wireless

Patrons are permitted AIRPASS access to one or more facilities by a prior allocation of a space to the passenger checkpoint through use of a personal wireless device such as a cellular telephone. A particular advantage of a cellular telephone is that it is a standard wireless communication means inexpensively accessible to many passengers, and is indeed a device, which is essentially becoming common place and owned and used regularly by consumers internationally. Cellular telephones are becoming the standard and common form of mass communication wirelessly, and as such the application of the disclosure is particularly directed to the cellular telephone form of wireless mobile communication device. Other mobile communications devices could be used, however the preferred application is for the cellular telephone, which is workable preferably for keying activation and/or voice actuation.

A passenger of a facility can conveniently use their cellular telephone in order to gain access to a passenger checkpoint. The cellular telephone is preferably capable of sending and receiving e-mail or text messages. Alternatively, the cellular telephone is preferably capable of retrieving and viewing Internet Web pages or data.

The passenger first registers with the reservation system. This may be date in a number of ways. For example, the passenger manually enters an identifier from their ticket, such as a ticket number, for instance an airline ticket, or a reservation locator, onto the keypad of their cellular pate. This identifier is then sent to a web site. A central computer validates that the ticket number or other identifier is a ticket issued on that day. This avoids the situation where a passenger accesses the web site and requests access to facilities when they are not going to be present in the airport that day. Once a passenger has been validated, messages are returned to their cellular telephone prompting passengers to choose from at least one of a plurality of facilities available for making reservations.

Alternatively, an employee at the airport venue may use a device such as a scanner to read information that the passenger's ticket. This eliminates any need for the passenger to manually enter a ticket number into the telephone. This information may be associated with the passenger's telephone number or other unique identifier associated with their personal wireless device and sent to a central computer. The passenger then receives a message on their cellular telephone prompting them to choose from at least one of a plurality of facilities for reserving access.

Once a passenger has been successfully validated or registered with the system, the system recognizes their personal wireless device for an allotted time period. For example, the allotted time period may be for the amount of time the ticket is good, such as one day. The passenger can then communicate back-and-forth, requesting reservations to a passenger checkpoint, and receiving validation of their reservation.

In an exemplary embodiment, validation is received in the form of a barcode image displayed on the cellular telephone display screen. The passenger then uses the cellular telephone at their entrance of the facility to validate their access to the passenger checkpoint by holding it up to a barcode scanning device.

In other embodiments, other media such as a paper ticket may be used. The passenger would go to a media generator to pick up their ticket. A bar code can be provided on the paper ticket.

The use of the AIRPASS system in a mobile sense with a wireless device such as a cellular telephone is now further described.

Figure 10:
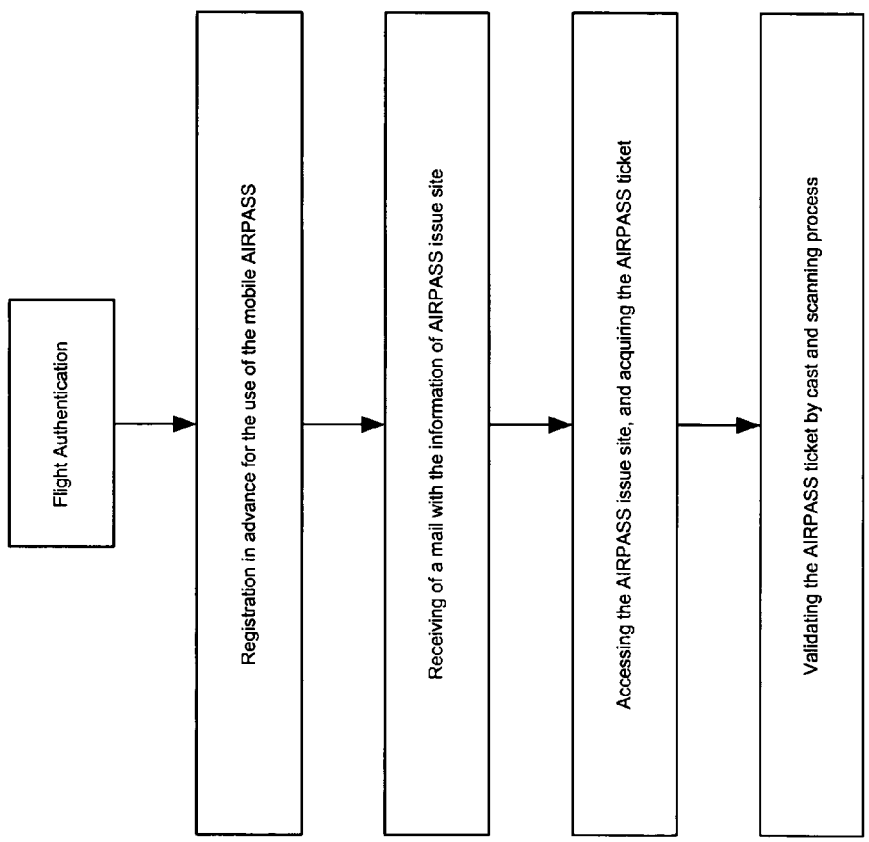
FIG. 10 is a process flow diagram illustrating a mobile AIRPASS system.

As is shown in FIG. 10, a passenger would enter a process to obtain an admission electronically. The cellular telephone is preferably capable of sending and receiving e-mail or text messages. Alternatively, the cellular telephone is preferably capable of retrieving and viewing Internet Web pages or data. This operation of the cellular telephone or wireless device can be effected by keying in requests, responding to prompts at a screen or orally. As such the device can include voice recognition software or other similar capabilities.

The passenger first registers with the mobile AIRPASS system. This may be date in a number of ways. For example, the passenger manually enters an identifier from their ticket (such as a ticket number) onto the keypad of their cellular phone. This identifier is then sent to a web site. A central computer validates that the ticket number or other identifier is that a ticket issued on that day. This avoids the situation where a passenger accesses the web site and requests access to facilities when they are not present in the airport. Once a passenger has been validated, messages returned to their cellular telephone prompting them to choose from at least one of a plurality of facilities available for making reservations.

Alternatively, an employee at the airport venue may use a device such as a scanner to read information that the passenger's ticket. This eliminates any need for the passenger to manually enter a ticket number into the telephone. This information may be associated with the passenger's telephone number or other unique identifier associated with their personal wireless device and sent to a central computer. The passenger then receives a message on their cellular telephone prompting them to choose from at least one of a plurality of facilities for which access is being reserved.

Figure 11:
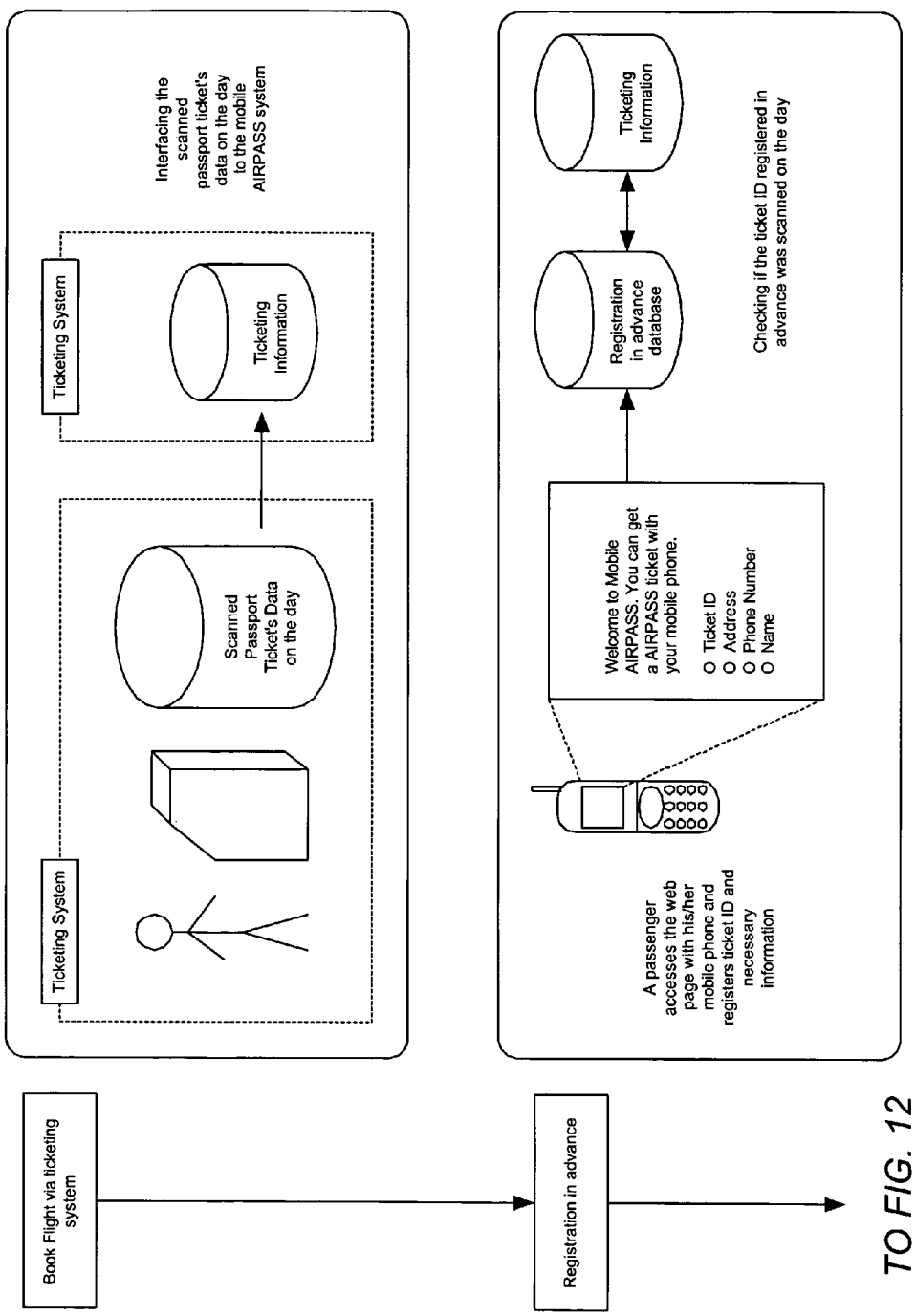
FIG. 11 is a more detailed indication of the process flow of the mobile AIRPASS system using a cellular telephone.
Figure 12:
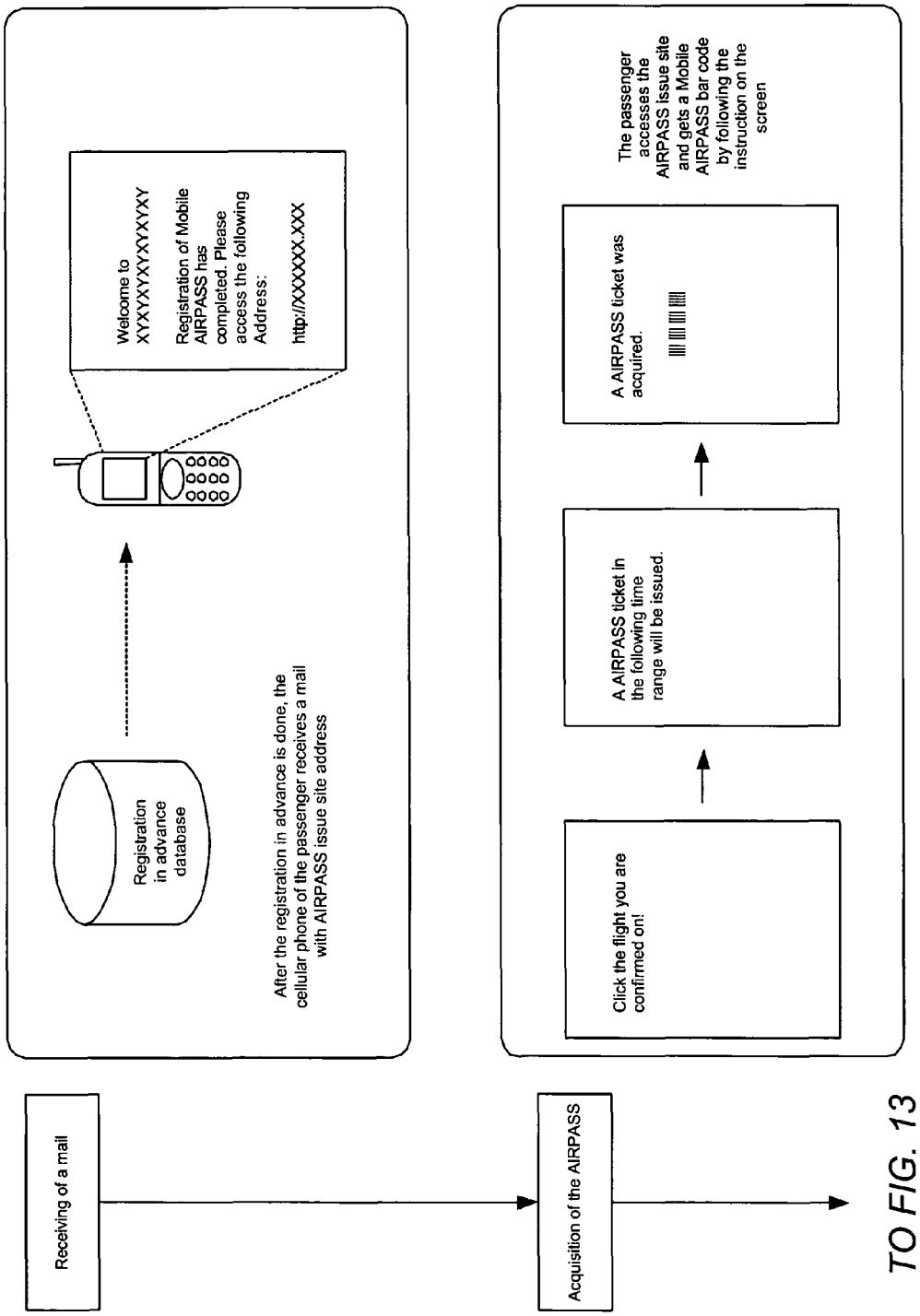
FIG. 12 is a further detailed illustration of the system showing the process flow of the mobile AIRPASS system using the cellular telephone.

More detail of a system in accordance with the present disclosure is shown in FIGS. 11 and 12.

Generally, an admission is purchased and issued to a passenger entering an airport environment. In one embodiment, the admission ticket data is scanned to the airport facility or venue. Ticket data for the day is made available to the AIRPASS system, granting those passengers who have purchased tickets access to the system and facility for that day. Thereafter, a cellular telephone is used to interface with the system.

In another embodiment, registration is effected in advance. A passenger accesses a web page through a cellular telephone or other web enabled device and register a ticket ID and the necessary information. The web telephone through a screen indicates the ability to get ticket information. This information can be sent to an e-mail address or can be sent to a physical address. When the registration is effected in advance, this is checked against an advanced database by passing a signal from the cellular telephone to the database through an appropriate transmission. Ticketing information is thereby obtained when there is consistency with the data.

Once a passenger has been successfully validated or registered with the system, the system recognizes their personal wireless device for an allotted time period. For example, the allotted time period may be for the amount of time the ticket is good for, such as one day. The passenger can then communicate back-and-forth, requesting reservations to a passenger checkpoint, and receiving validation of their reservation.

In some embodiments, validation is acquired by accessing the AIRPASS issue site and acquiring an actual AIRPASS ticket. Through the cellular telephone, the passenger would receive mail with information on the AIRPASS issue site, which can be located at a kiosk or different site in the airport environment or some resort or facility associated with the airport environment.

Figure 13:
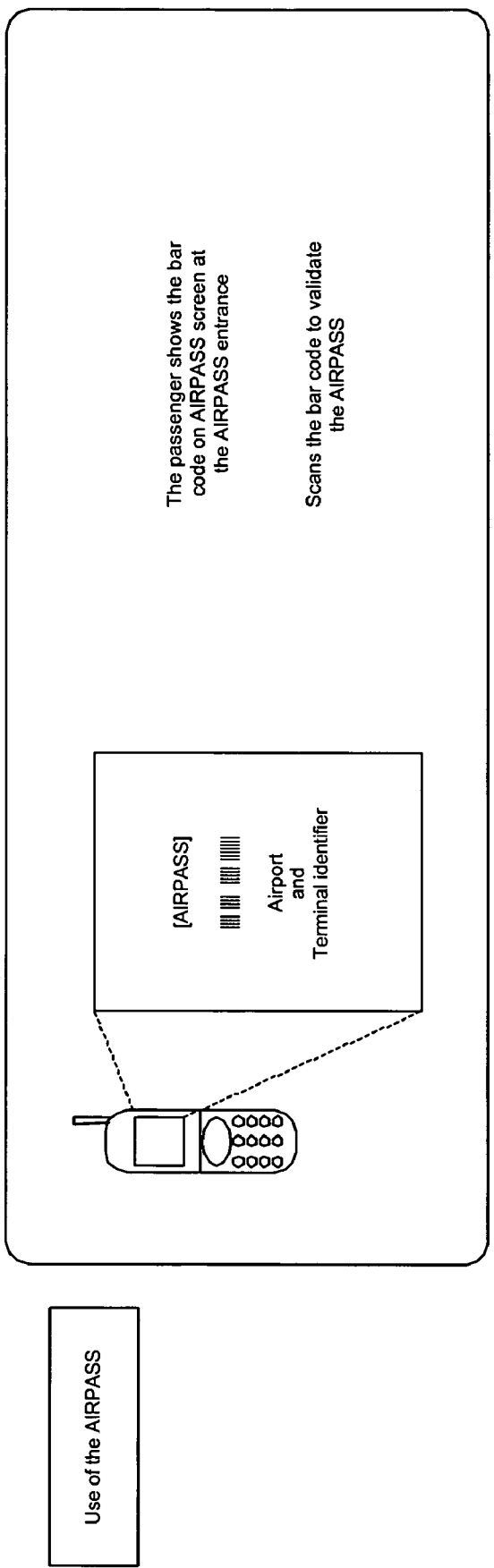
FIG. 13 is a continuation of the process flow showing the mobile AIRPASS system using the cellular telephone.

In an exemplary embodiment, validation is received in the form of a barcode image displayed on the cellular telephone display screen, as is illustrated in FIG. 13. The passenger then uses the cellular telephone at the entrance of the facility to validate their access to the passenger checkpoint by holding it up to a barcode scanning device. In other embodiments, other media such as a paper ticket may be used. The passenger must go to such a media generator to pick up their ticket.

When there is information received which conforms to the advance database registration, the cellular telephone of the passenger receives an e-mail with the AIRPASS issue site address. The screen of the cellular telephone will then show the appropriate welcoming message to AIRPASS indicating the appropriate website. Through the interaction with the keypad on the cellular telephone, the AIRPASS is acquired by clicking through different facilities and selecting the AIRPASS at a time range which is available and given by the provider of the ticket. When an AIRPASS ticket is acquired, a barcode or the like is then displayed on the cellular telephone of the user. The use of the AIRPASS is achieved by presenting the barcode in front of a scanner to validate the AIRPASS entry. The scanner would be associated with the passenger checkpoint.

Figure 14:
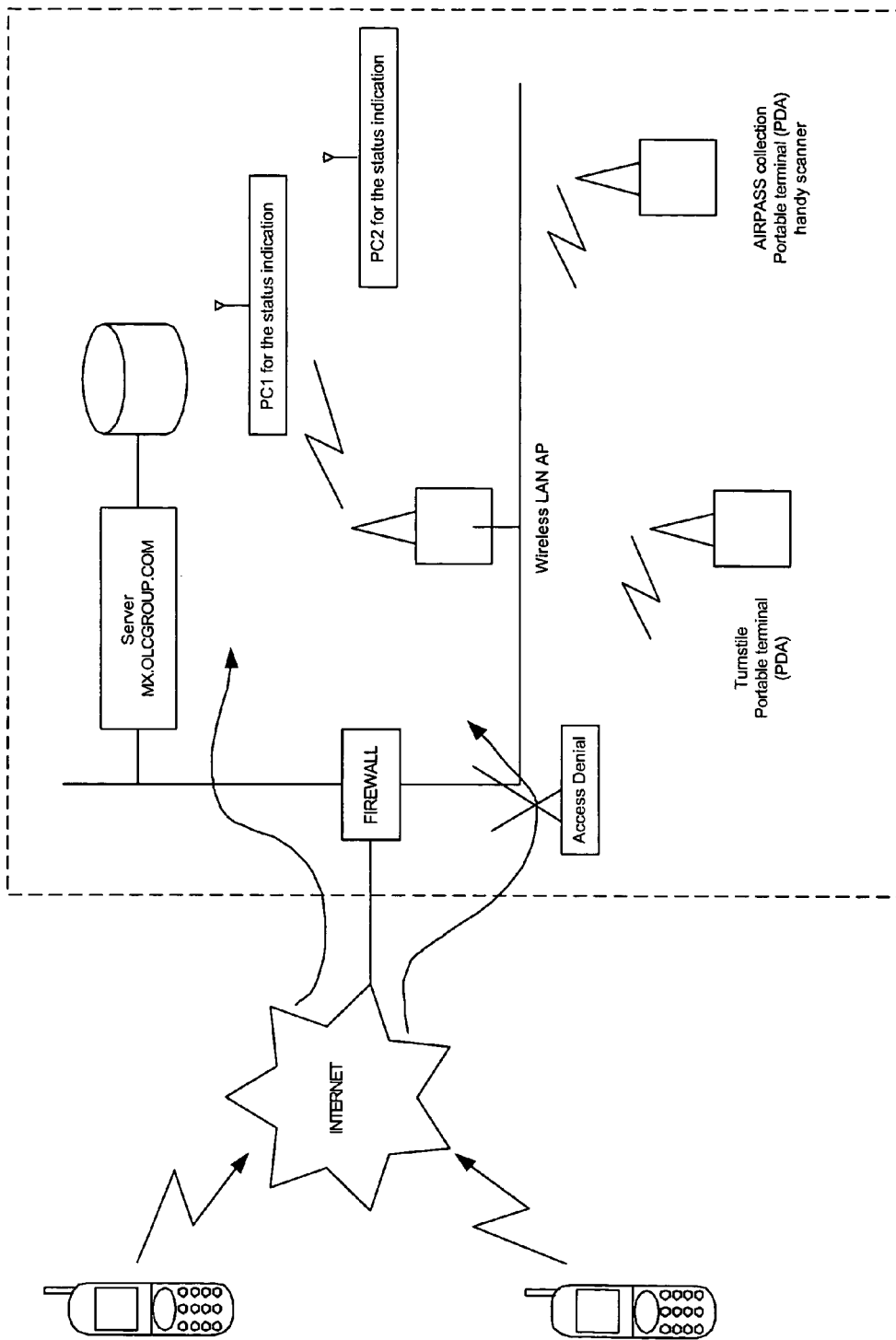
FIG. 14 is an illustration of the system environment using a cellular telephone through a wireless connection with a facility site.

FIG. 14 is a further illustration of a mobile system in accordance with the present disclosure. Cellular telephones having the ability to access web pages are utilized by passengers to communicate with a server in order to request and receive access to a passenger checkpoint. An appropriate firewall is in place and where access is possible to the server, communications take place between the cellular telephone and the server. Communication with the server may be restricted or limited based on the telephone service provider. There are additionally appropriate computers PC1 and PC2 transmit information to the server wirelessly or through LAN line as necessary.

Figure 15:
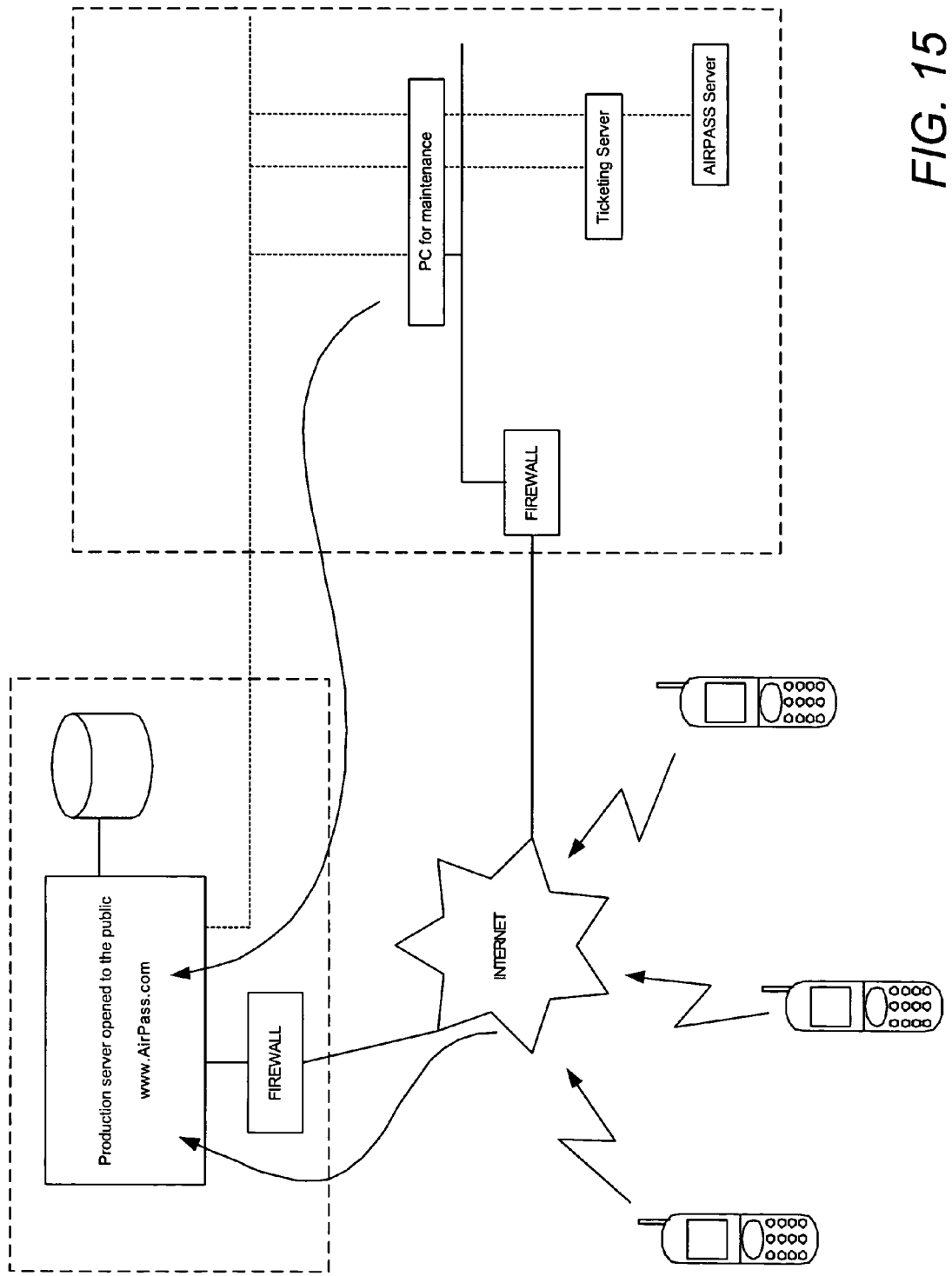
FIG. 15 is a further illustration of a cellular telephone use and wireless connection with an airport environment showing the computers for controlling the operation of the AIRPASS system.

As illustrated in FIG. 15, the cellular telephone communicates through the firewall with the server operating the website. Similarly, the cellular telephone operates through the firewall with a database management system and computers for issuing tickets and AIRPASS tickets. There can be a dedicated line connection between the production server operating the website and the servers operating the facilities and access to the facilities through the airport environment.

Figure 16:
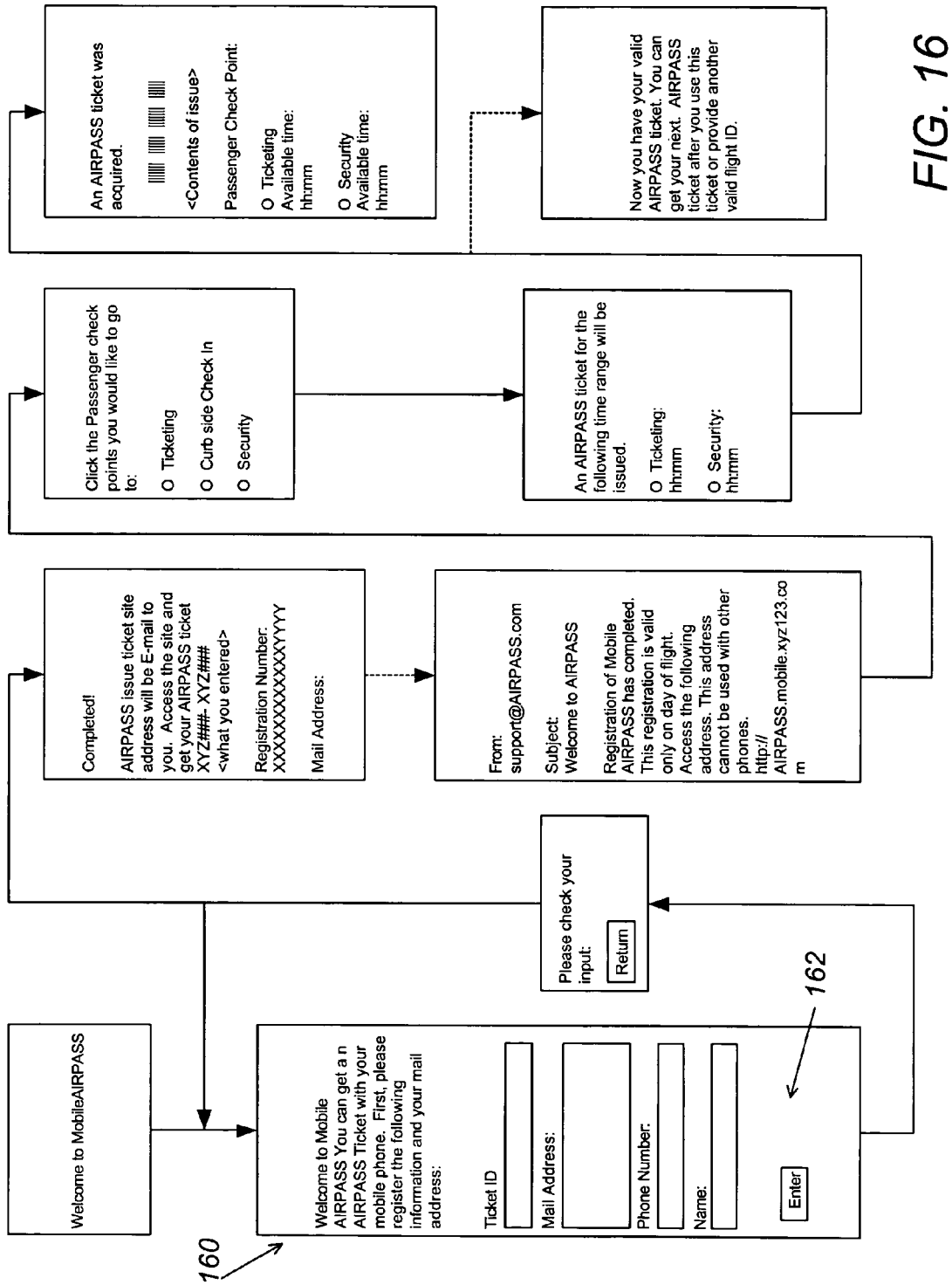
FIG. 16 is a flow diagram illustrating the process flow from registration to issue of an AIRPASS as shown in relation to the messages flowing to the screen of the input device to the point of obtaining the AIRPASS ticket.
Figure 17:
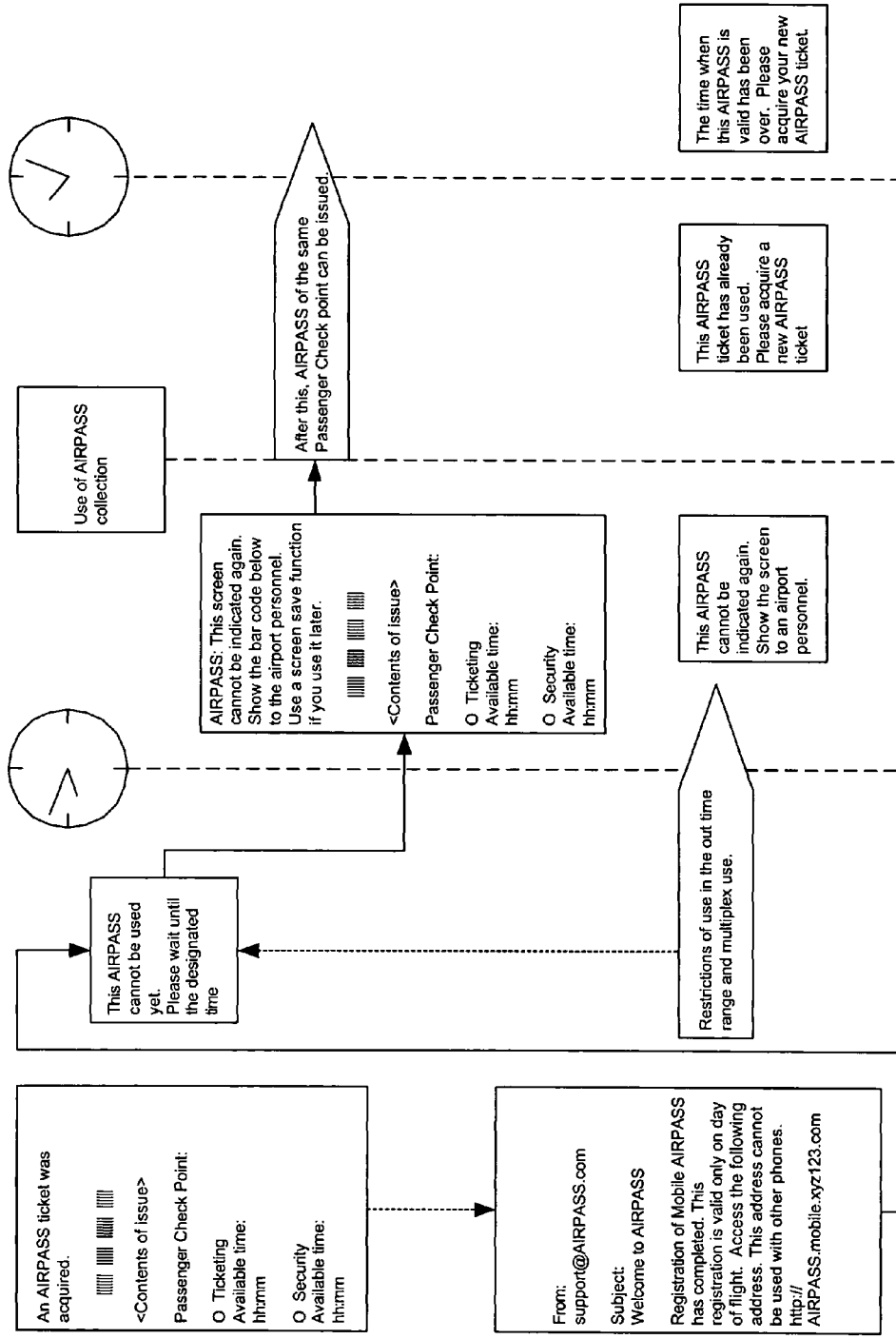
FIG. 17 is a process flow diagram illustrating the use of the AIRPASS with the mobile device at a passenger checkpoint accessible at an AIRPASS basis with the AIRPASS device.

FIGS. 16-17 show the message flow at a screen of a cellular telephone as presented to a user in one embodiment of the present disclosure. A message is generated from the server operating the AIRPASS site. Welcome message 160 is shown along with information regarding registration 162. The user is prompted to enter information such as ticket ID, mailing address, and telephone number. This information is then sent to a server for processing to ensure that the ticket ID or number is valid. Confirmation that registration has been successfully completed along with the address or link to the AIRPASS ticket issue site is then sent by e-mail to the user. Information is given to the user on the cellular telephone about the AIRPASS ticket and the registration number.

A user uses selection means on the telephone to select the different facilities for which the user requires an AIRPASS ticket. Return times are then provided by the computer system operating the loading at the passenger checkpoint and other facilities in the airport environment. When an AIRPASS ticket is acquired, a barcode or other such signal is provided to the cellular telephone, which can then be used at the facility when using the AIRPASS to access the passenger checkpoint. Information about the issued AIRPASS is then presented to the user including indications as to when the AIRPASS is available for use, such as being in or out of time, whether the AIRPASS can be used for more than one passenger and/or whether the AIRPASS can be used multiple times.

Other examples of the use of the disclosure include the ability to have a passenger's or user's cellular telephone or wireless device be tracked as that passenger moves around the facility, or defined area. For instance, this provides for locating passengers or passengers and for the central facility computer to track the location of passengers and passengers, and make recommendations as necessary to those passengers. In an airport environment, when a particular passenger checkpoint is non-functional for instance, such as an AIRPASS system being not operative, alternative facilities can be provided to the passengers. Such alternatives can be effected on an AIRPASS basis in lieu of the unavailable AIRPASS services for the non-available passenger checkpoint.

Figure 18:
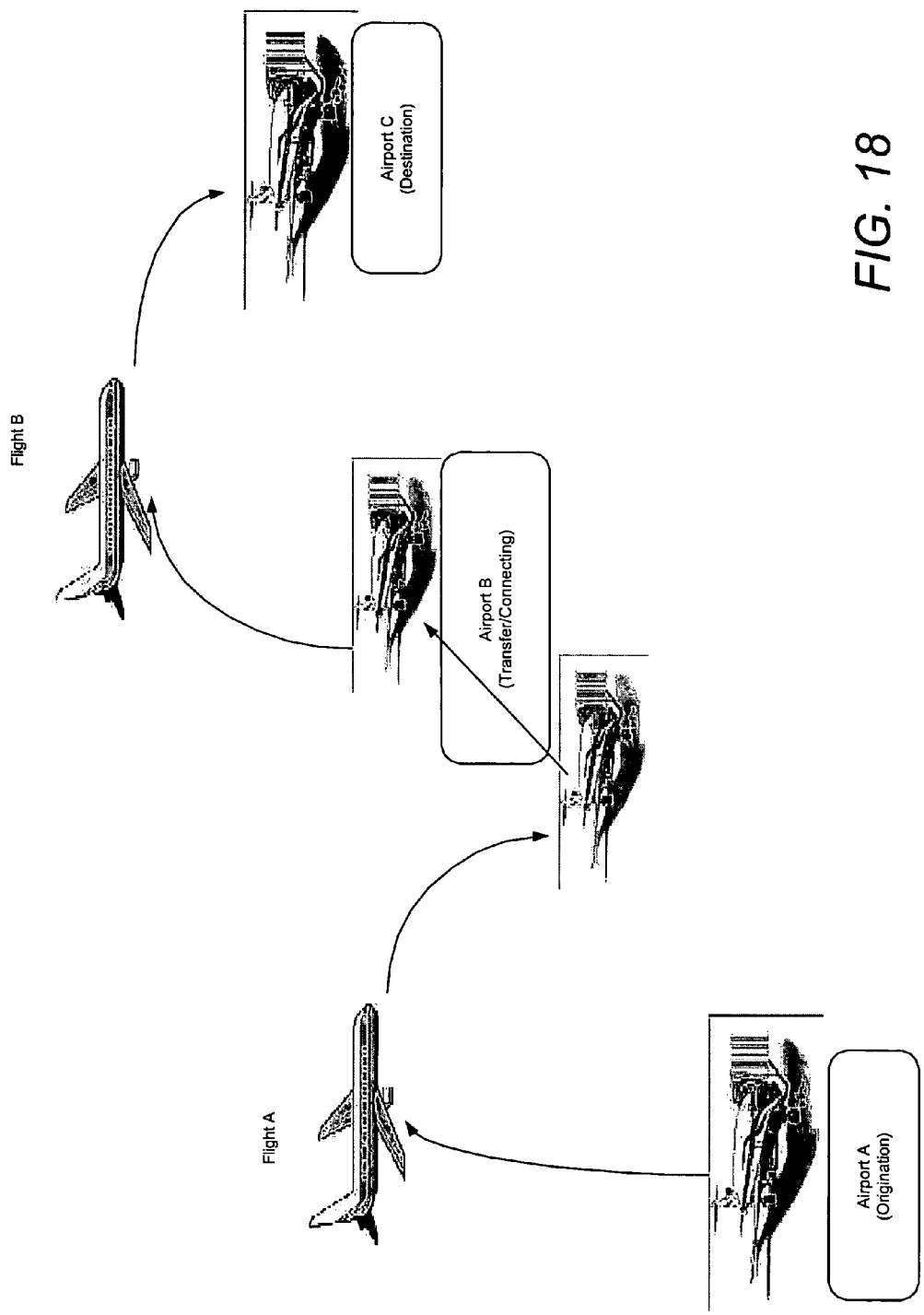
FIG. 18 is an illustration of the use of AIRPASS in conjunction with multiple airports including origination, transfer/connecting and destination locations.

FIG. 18 is an illustration of the use of AIRPASS in conjunction with multiple airports including origination, transfer/connecting and destination locations. Flight A is scheduled using the AIRPASS described above process from an origination location of Airport A to a transfer/connecting destination of Airport B. Flight B is scheduled using the AIRPASS described above process from Airport B to designation of Airport C.

General

Other kinds of environments envisioned by the disclosure include those where unnecessary crowding or congestion may occur and/or where it is desirable to control the flow of masses of passengers, baggage or cargo to or from a desired location. When boarding passes are printed off-site, for instance at a home computer, the AIRPASS system also assists in scheduling the arrival of passengers for arrival at and security checks in at airports. Thus an AIRPASS holder can have priority or preferences at a control point and not be subject to a first-in first out line processing at the control point.

Also, the system can be used for guiding and controlling masses of people in the use of limited transportation systems, such as in public transport systems including rail, marine and bus transportation.

Many other examples of the disclosure exist, each differing from others in matters of detail only. Although the invention has been described with reference to airport facilities, the system is equally applicable to other travel centers such as rail stations and ship and ferry terminals.

Other variations of the disclosure include, for instance, the use of dtmf (tone choices), voice recognition, and sms (short messages service) as communication mediums along with web/wap. These media are particularly for use with the cell phone/wireless applications. AIRPASS acquisition can be directly achieved at a dedicated website with or without a wireless device for contacting to the site. The different features of the disclosure can be achieved by the programs of the disclosure and made available selectively as required or preferred at the website.

Of course, the foregoing descriptions is that of one or more embodiments of the disclosure, and various changes and modifications may be made without departing from the spirit and scope of the disclosure, as defined by the claims.

We claim:

1. A system for processing passengers for departure from a travel facility comprising:
   a computer;
   a first queue for passengers to be processed through a control point monitored by the computer on the basis of first-in first-out;
   second queue for passengers to be processed through the control point that avoids the first queue; and
   an algorithm processed in the computer for determining a first queue load related to a number of passengers in the first queue at a selected time and determining a number of spaces available in the second queue to allocate to passengers, upon passenger request to the computer, to optimize throughput at the control point, wherein a passenger present in the second queue as allocated by the computer may be processed through the control point in preference to passengers in the first queue.

2. The system as claimed in claim 1, wherein the determination of spaces available in the second queue is determined solely by load conditions in the first queue.

3. The system as claimed in claim 1, wherein each passenger requesting access to the control point via the second queue is provided with a return time during which that passenger may be processed through the control point via the second queue.

4. The system as claimed in claim 1, wherein the travel facility is an airport and availability for the second queue is determined by at least one characteristic including: status of a passenger relative to an airline class of service; delays in flight times of one or more flights using the airport; cancellations of other flights using the airport; security factors at the airport; staffing at the airport; calendar date of flight, time of day of flight; number of passengers for the flight; numbers of passengers for other flights; and baggage handling.

5. The system as claimed in claim 1, wherein the passengers for the second queue are identified by biometric features.

6. The system as claimed in claim 1, including a communications system between a master controller programming for controlling conditions and schedules for passengers scheduled to use the second queue whereby status information relating to the status or changes of the second queue can be communicated to such second queue passengers.

7. The system as claimed in claim 1, including storing selected user profiles and wherein a master controller queries a database capturing a number of requests for the second queue and includes obtaining terminal information and an assigned return time, and including permitting notification to security personnel if a passenger request matches an unwanted user profile.

8. A system for processing passengers for arrival at a travel facility comprising:
   a computer;
   a first queue for passengers to be processed through a control point on the basis of first-in first-out;
   a second queue for passengers to be processed that avoids the first queue; and
   an algorithm processed in the computer for determining the likely queue load related to a number of passengers in the first queue at a selected time and thereby determining a number of spaces in the second queue to allocate to passengers requesting the second queue for processing at the control point on preference to passengers in the first queue.

9. The system as claimed in claim 8, wherein the travel facility is an airport.

10. The system as claimed in claim 9, wherein the availability for the second queue is determined by at least one characteristic including: status of the passenger relative to an airline class of service; delays in flight times of one or more flights using the airport; cancellations of other flights using the airport; security factors at the airport; staffing at the airport; calendar date of flight, time of day of flight; number of passengers for the flight; numbers of passengers for other flights; and baggage handling.

11. The system as claimed in claim 8, wherein the availability for the second queue is not determined by status of the passenger relative to an airline queue class of service.

12. The system as claimed in claim 8, wherein the passengers for the second queue are identified by biometric features.

13. The system as claimed in claim 8, including a communications system between a master controller programming for controlling conditions and schedules for passengers scheduled to use the second queue whereby status information relating to status or changes of the second queue can be communicated to such second queue passengers.

14. A system for processing passengers at a travel facility wherein there are multiple passenger control points, and wherein each of the multiple passenger control points is assigned for dynamically changing capacity for handling processing comprising: a computer monitoring one or more of the control points;
a first set of queues for passengers to be processed through one of the control points on the basis of first-in first out, wherein each queue of the first set of queues is associated with a variable related to a passenger and each queue of the first set of queues has a distinctive variable from each other queue;
a second set of queues for passengers to be processed through the one of the control points that avoids the first set of queues, wherein each queue of the second set of queues is related to at least one variable of the first set of queues; and
an algorithm processed in the computer for determining a queue load related to a number of passengers in each of the first set of queues at a selected time and thereby determining a number of spaces to allocate via the computer to the second set of queues.

15. A method of managing passenger access to a portion of a travel facility through a control point at the travel facility wherein passengers are permitted access to the portion of the facility through the control point on at least two bases, the first being a first-in first-out basis, and the second being a priority basis established by a prior allocation of a return time, comprising:
receiving from a passenger a priority request for an allocation of a return time, the priority request being received at a central computer that regulates the flow of passengers allowed to enter the facility through the control point;
determining in the computer an allocated return time; transmitting to the passenger an-the allocated return time; making the control point available to patrons not having the allocated return time on a first-in first-out basis unless a passenger having the allocated return time is present and preferentially loaded during the return time; and
loading the present passenger having the allocated return time to the control point during the return time in preference to the patrons not having the allocated return time.

16. The method of claim 15, wherein the travel facility is an airport.

17. The method of claim 15, wherein the priority request is made via a telephone or cell phone.

18. The method of claim 17, wherein the telephone is a cell phone.

19. The method of claim 15, wherein the return time is redeemed through an automatic procedure, wherein the automatic procedure includes any one of a reading of a radio frequency identification allocated to the passenger, a reading of a magnetic code allocated to the passenger, or a reading of a barcode allocated to the passenger.

20. The method of claim 15, wherein said allocated return time may or may not be redeemed by said passenger, and further comprising the steps of determining a number of unredeemed return times to the number of allocated times, and feeding back redemptions of return times such that near real time updates of return time availability may be computed.

21. A method for real time adjustment of the flow of passengers through a control point at a travel facility, thereby permitting an optimized throughput for the control point, the method comprising:
establishing a first queue by which the passengers may access the control point on a first in first out basis, and establishing a second queue by which a passenger avoids the first queue;
validating an entitlement of the passenger to access the second queue;
determining at one or more times, a real time operating capacity of the control point;
determining a mix ratio of first queue passengers and second queue passengers; and
providing data about the real time operating capacity and said mix ratio to a controller system for determining an assigned time period for access to the control point via the second queue, generating and issuing a media having the determined time period determined by the controller to a requesting passenger during which the requesting passenger may access the control point via the second queue.

22. The method according to claim 21, wherein the assigned time period is the next available time period as determined by an algorithm performed by the controller system.

23. The method according to claim 21, further comprising issuing a media to the requesting passenger having the time period thereon.

24. A system for processing passengers for access to a travel facility for departure from the travel facility comprising:
a first queue by which passengers are processed through a control point at the travel facility on a first in-first out basis;
a second queue for passengers to be processed through the control point that avoids the first queue;
a first validator for establishing a right of a passenger to access the second queue; a controller for determining an assigned time period for the passenger to access the second queue and generating and issuing an entitlement having the assigned time period during which the passenger having the right and holding the entitlement may access the second queue in order to avoid the first queue; and a second validator for permitting the entitled passenger to access the control point via the second queue in preference to the first queue during the assigned time period if the entitled passenger presents to the second queue during the assigned time period.

25. The system according to claim 24, wherein the time period is determined by an algorithm that considers a likely queue load in the first queue in determining available time periods to be provided on entitlements issued to the passengers for access via the second queue.

26. The system according to claim 24, wherein availability of the entitlement for the second queue is not determined by status of a passenger relative to a class of travel service.

27. The system according to claim 24, wherein availability of the entitlement for the second queue is determined by at least one characteristic including: status of a passenger relative to a class of travel service; delays in departure times of one or more travel vehicles using the travel facility; cancellations of other travel vehicles using the travel facility staffing at the travel facility; calendar date of departure; time of day of departure; number of passengers for the vehicle; numbers of passengers for other vehicles; and baggage handling.

28. The system according to claim 24, wherein only a single time period is generated and assigned to any one passenger at any one time.

29. The system according to claim 24, further comprising a media distributor for distributing an entitlement media to each entitled passenger requesting second queue entry to the control point via the first validator.

30. The system according to claim 29, wherein the entitlement media is a printed pass stating the return time period thereon.

31. The system according to claim 29, wherein the second validator is a reader for the entitlement media held by passengers.

* * * * *